US011882298B2

(12) United States Patent
Li et al.

(10) Patent No.: US 11,882,298 B2
(45) Date of Patent: *Jan. 23, 2024

(54) SIGNALING OF VIDEO CODING TOOLS SUPPORTING VARIOUS CHROMA FORMAT

(71) Applicant: TENCENT AMERICA LLC, Palo Alto, CA (US)

(72) Inventors: Ling Li, Seoul (KR); Xiang Li, Saratoga, CA (US); Cheung Auyeung, Sunnyvale, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/733,040

(22) Filed: Apr. 29, 2022

(65) Prior Publication Data

US 2022/0264126 A1 Aug. 18, 2022

Related U.S. Application Data

(63) Continuation of application No. 17/104,688, filed on Nov. 25, 2020, now Pat. No. 11,343,516.

(Continued)

(51) Int. Cl.
*H04N 19/186* (2014.01)
*H04N 19/70* (2014.01)
(Continued)

(52) U.S. Cl.
CPC ......... *H04N 19/186* (2014.11); *H04N 19/117* (2014.11); *H04N 19/124* (2014.11);
(Continued)

(58) Field of Classification Search
CPC ............................ H04N 19/186; H04N 19/117
(Continued)

(56) References Cited

U.S. PATENT DOCUMENTS

2008/0298694 A1  12/2008  Kim et al.
2014/0301469 A1* 10/2014  Wang ................... H04N 19/513
375/240.16

(Continued)

FOREIGN PATENT DOCUMENTS

WO  2021/080904 A1  4/2021

OTHER PUBLICATIONS

Extended European Search Report dated Mar. 23, 2023 in Application No. 20894849.7.

(Continued)

*Primary Examiner* — Amir Shahnami
(74) *Attorney, Agent, or Firm* — Sughrue Mion, PLLC

(57) ABSTRACT

A method of decoding an encoded video. The method includes obtaining the encoded video bitstream and determining whether a chroma array type of a video sequence included in the encoded video bitstream is a first chroma array type indicating that the video sequence includes multiple color planes and that the multiple color planes are jointly. In addition, based on determining that the chroma array type is not the first chroma array type, the method further includes setting a value of at least one syntax element to zero without parsing the at least one syntax element from the encoded video bitstream, and based on the value of the at least one syntax element being zero, decoding the video sequence without applying at least one tool corresponding to the at least one syntax element.

20 Claims, 9 Drawing Sheets

Related U.S. Application Data

(60) Provisional application No. 62/947,385, filed on Dec. 12, 2019, provisional application No. 62/942,003, filed on Nov. 29, 2019.

(51) Int. Cl.
*H04N 19/117* (2014.01)
*H04N 19/82* (2014.01)
*H04N 19/124* (2014.01)
*H04N 19/184* (2014.01)

(52) U.S. Cl.
CPC .......... *H04N 19/184* (2014.11); *H04N 19/70* (2014.11); *H04N 19/82* (2014.11)

(58) Field of Classification Search
USPC .................................................... 375/240.02
See application file for complete search history.

(56) References Cited

U.S. PATENT DOCUMENTS

2015/0078456 A1* 3/2015 Hannuksela ........... H04N 19/42
375/240.01
2016/0100168 A1* 4/2016 Rapaka .................. H04N 19/60
375/240.03

OTHER PUBLICATIONS

Cheung Auyeung et al., "Modifications to VVC Draft 7 to support monochrome and independently coded color planes", Joint Video Experts Team (JVET) of ITU-T SG 16 WP 3 and ISO/IEC JTC 1/SC 29/WG 11, JVET-Q0265, Jan. 7-17, 2020, 17th Meeting, Brussels, BE, pp. 1-6 (6 total pages).
Ru-Ling Liao et al., "AHG9: Syntax cleanup of chroma coding tools in 444 color format", Joint Video Experts Team (JVET) of ITU-T SG 16 WP 3 and ISO/IEC JTC 1/SC 29/WG 11, JVET-Q0329-v1, Jan. 7-17, 2020, 17th Meeting, Brussels, BE, pp. 1-3 (3 total pages).
Benjamin Bross et al., "Versatile Video Coding (Draft 6)", Joint Video Experts Team (JVET) of ITU-T SG 16 WP 3 and ISO/IEC JTC 1/SC 29/WG 11, JVET-O2001-vC, Jul. 3-12, 2019, Gothenburg, SE, pp. 1-419 (435 total pages).
Helmrich Christian, "#371 Avoid reading unused slice-level elements for joint coding of chroma residuals (JCCR) when sps_joint_cbcr_enabled_flag==0", JVET VVC, Jul. 24, 2019, pp. 1-3 (3 total pages), Retrieved from the Internet: URL: https//jvet.hhi.fraunhofer.de/trac/vvc/ticket/371.
Benjamin Bross et al., Versatile Video Coding (Draft 7), Joint Video Experts Team (JVET) of ITU-T SG 16 WP 3 and ISO/IEC JTC 1/SC 29/WG 11, JVET-P2001-v9, Oct. 1-11, 2019, 16th Meeting, Geneva, CH.
Office Action dated Nov. 28, 2022 in Japanese Application No. 2021-557676.
Written Opinion of the International Searching Authority dated Feb. 25, 2021 in Application No. PCT/US20/62477.
International Search Report dated Feb. 25, 2021 in Application No. PCT/US20/62477.
Benjamin Bross et al., "Versatile Video Coding (Draft 6)", Joint Video Experts Team (JVET) of Itu-T SG 16 WP 3 and ISO/IEC JTC 1/SC 29/WG 11, JVET-O2001-vE, Jul. 3-12, 2019, Gothenburg, SE, pp. 1-439 (455 total pages).

* cited by examiner

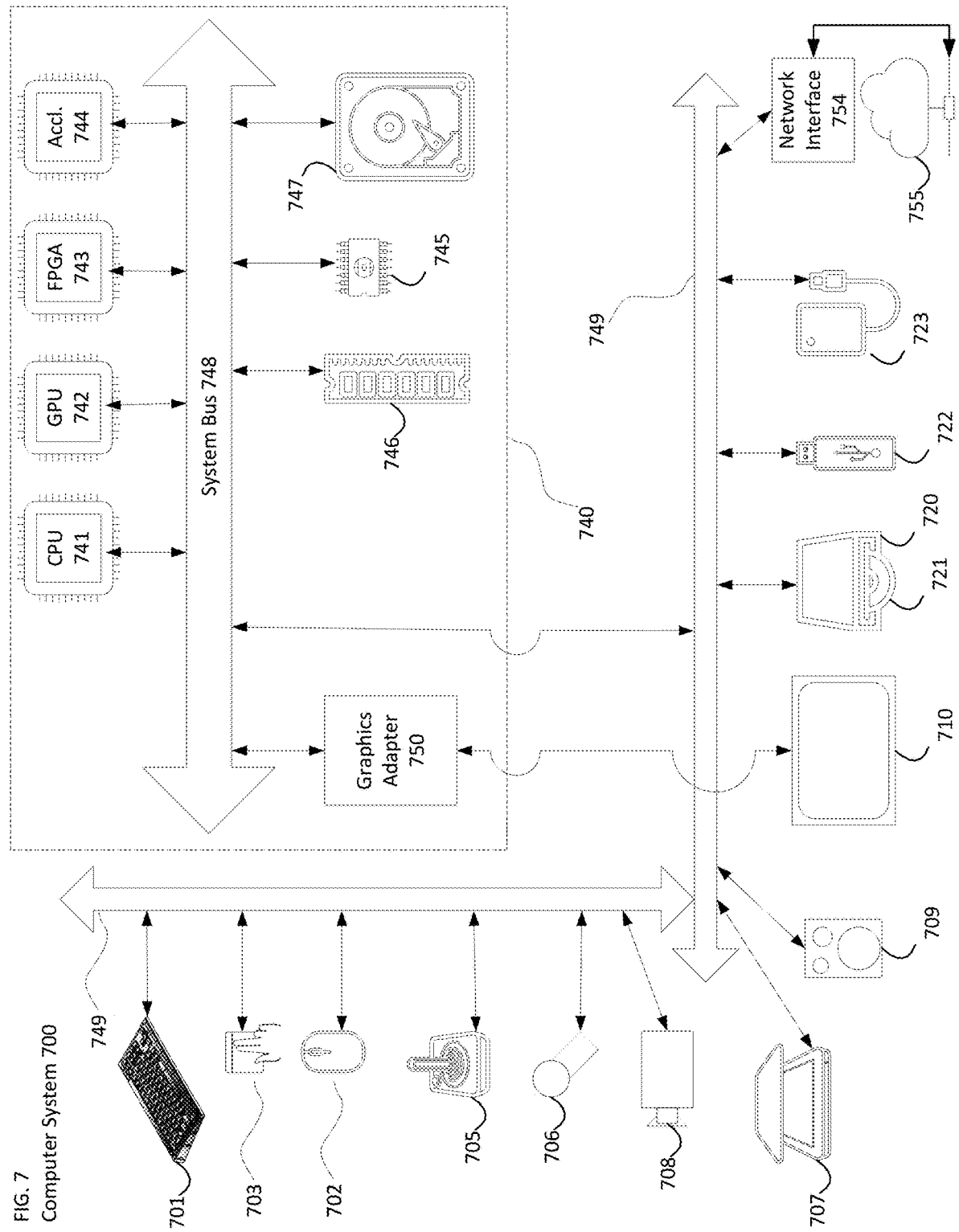

SIGNALING OF VIDEO CODING TOOLS SUPPORTING VARIOUS CHROMA FORMAT

CROSS-REFERENCE TO RELATED APPLICATION

This application is continuation of U.S. application Ser. No. 17/104,688 filed on Nov. 25, 2020, which claims priority from 35 U.S.C. § 119 to U.S. Provisional Application No. 62/942,003, filed on Nov. 29, 2019, in the United States Patent & Trademark Office, and U.S. Provisional Application No. 62/947,385, filed on Dec. 12, 2019, in the United States Patent & Trademark Office, the disclosures of which are incorporated herein by reference in their entireties.

FIELD

The disclosed subject matter relates to video coding and decoding, and more specifically, to signaling of video coding tools supporting various chroma formats.

BACKGROUND

ITU-T VCEG (Q6/16) and ISO/IEC MPEG (JTC 1/SC 29/WG 11) published the H.265/HEVC (High Efficiency Video Coding) standard in 2013 (version 1) 2014 (version 2) 2015 (version 3) and 2016 (version 4). In 2015, these two standard organizations jointly formed the JVET (Joint Video Exploration Team) to explore the potential of developing the next video coding standard beyond HEVC. In October 2017, they issued the Joint Call for Proposals on Video Compression with Capability beyond HEVC (CfP). By Feb. 15, 2018, total 22 CfP responses on standard dynamic range (SDR), 12 CfP responses on high dynamic range (HDR), and 12 CfP responses on 360 video categories were submitted, respectively. In April 2018, all received CfP responses were evaluated in the 122 MPEG/10th JVET meeting. As a result of this meeting, JVET formally launched the standardization process of next-generation video coding beyond HEVC. The new standard was named Versatile Video Coding (VVC), and JVET was renamed as Joint Video Expert Team.

SUMMARY

In an embodiment, there is provided a method of decoding an encoded video bitstream, including obtaining the encoded video bitstream; determining whether a chroma array type of a video sequence included in the encoded video bitstream is a first chroma array type indicating that the video sequence includes multiple color planes and that the multiple color planes are jointly encoded; based on determining that the chroma array type is not the first chroma array type, setting a value of at least one syntax element to zero without parsing the at least one syntax element from the encoded video bitstream; and based on the value of the at least one syntax element being zero, decoding the video sequence without applying at least one tool corresponding to the at least one syntax element.

In an embodiment, there is provided a device for decoding an encoded video bitstream, including at least one memory configured to store program code; and at least one processor configured to read the program code and operate as instructed by the program code, the program code including: obtaining code configured to cause the at least one processor to obtain the encoded video bitstream; determining code configured to cause the at least one processor to determine whether a chroma array type of a video sequence included in the encoded video bitstream is a first chroma array type indicating that the video sequence includes multiple color planes and that the multiple color planes are jointly encoded; first setting code configured to cause the at least one processor to, based on determining that the chroma array type is not the first chroma array type, set a value of at least one syntax element to zero without parsing the at least one syntax element from the encoded video bitstream; and first decoding code configured to cause the at least one processor to, based on the value of the at least one syntax element being zero, decode the video sequence without applying at least one tool corresponding to the at least one syntax element.

In an embodiment, there is provided a non-transitory computer-readable medium storing instructions, the instructions including: one or more instructions that, when executed by one or more processors of a device for decoding an encoded video bitstream, cause the one or more processors to: obtain the encoded video bitstream; determine whether a chroma array type of a video sequence included in the encoded video bitstream is a first chroma array type indicating that the video sequence includes multiple color planes and that the multiple color planes are jointly encoded; based on determining that the chroma array type is not the first chroma array type, set a value of at least one syntax element to zero without parsing the at least one syntax element from the encoded video bitstream; and based on the value of the at least one syntax element being zero, decode the video sequence without applying at least one tool corresponding to the at least one syntax element.

BRIEF DESCRIPTION OF THE DRAWINGS

Further features, the nature, and various advantages of the disclosed subject matter will be more apparent from the following detailed description and the accompanying drawings in which:

FIG. 7 is a schematic illustration of a computer system in accordance with an embodiment.

DETAILED DESCRIPTION

Figure 1:
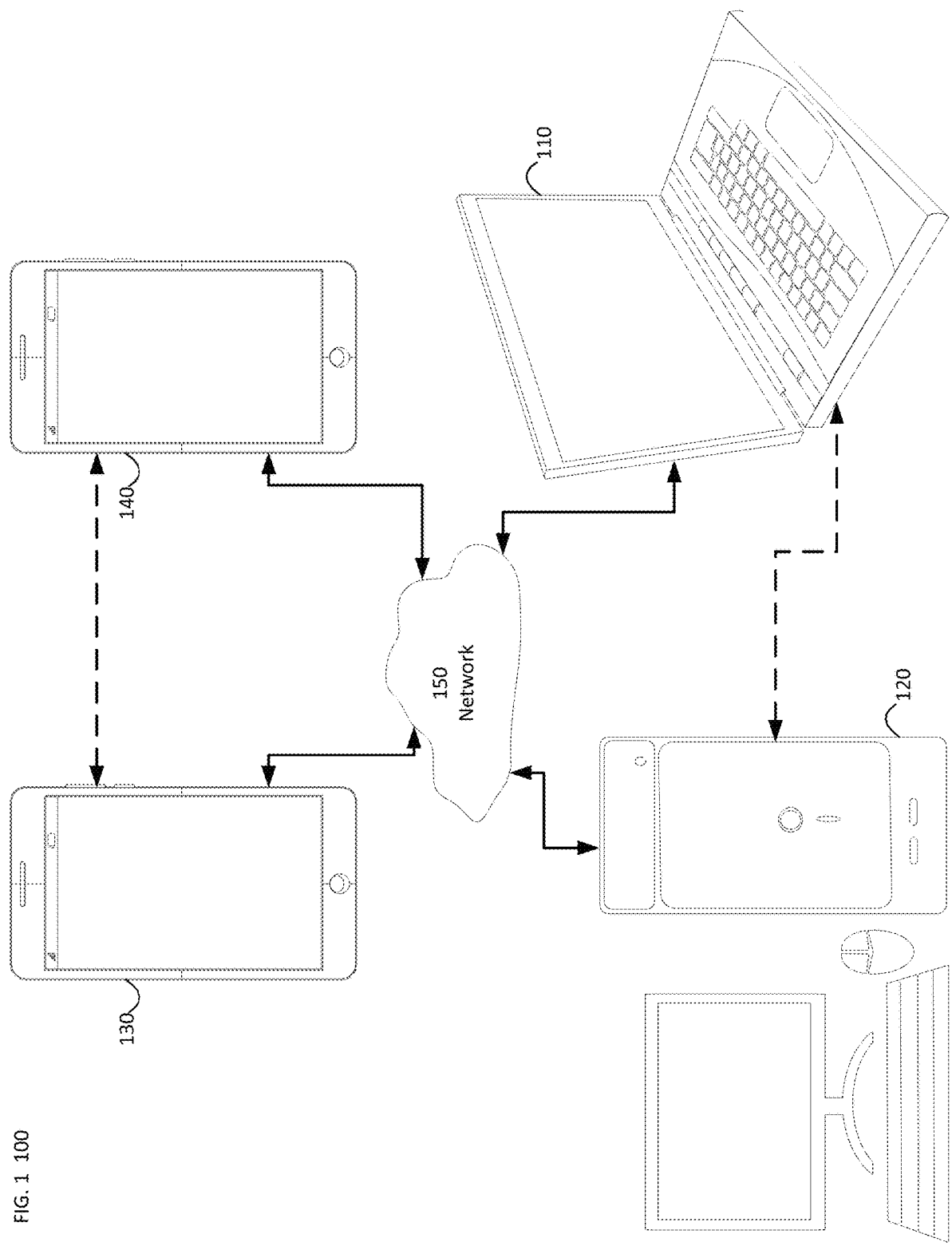
FIG. 1 is a schematic illustration of a simplified block diagram of a communication system in accordance with an embodiment.

FIG. 1 illustrates a simplified block diagram of a communication system (100) according to an embodiment of the present disclosure. The system (100) may include at least two terminals (110-120) interconnected via a network (150). For unidirectional transmission of data, a first terminal (110) may code video data at a local location for transmission to the other terminal (120) via the network (150). The second terminal (120) may receive the coded video data of the other terminal from the network (150), decode the coded data and display the recovered video data. Unidirectional data transmission may be common in media serving applications and the like.

FIG. 1 illustrates a second pair of terminals (130, 140) provided to support bidirectional transmission of coded video that may occur, for example, during videoconferencing. For bidirectional transmission of data, each terminal (130, 140) may code video data captured at a local location for transmission to the other terminal via the network (150). Each terminal (130, 140) also may receive the coded video data transmitted by the other terminal, may decode the coded data and may display the recovered video data at a local display device.

In FIG. 1, the terminals (110-140) may be illustrated as servers, personal computers and smart phones but the principles of the present disclosure may be not so limited. Embodiments of the present disclosure find application with laptop computers, tablet computers, media players and/or dedicated video conferencing equipment. The network (150) represents any number of networks that convey coded video data among the terminals (110-140), including for example wireline and/or wireless communication networks. The communication network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the present disclosure unless explained herein below.

Figure 2:
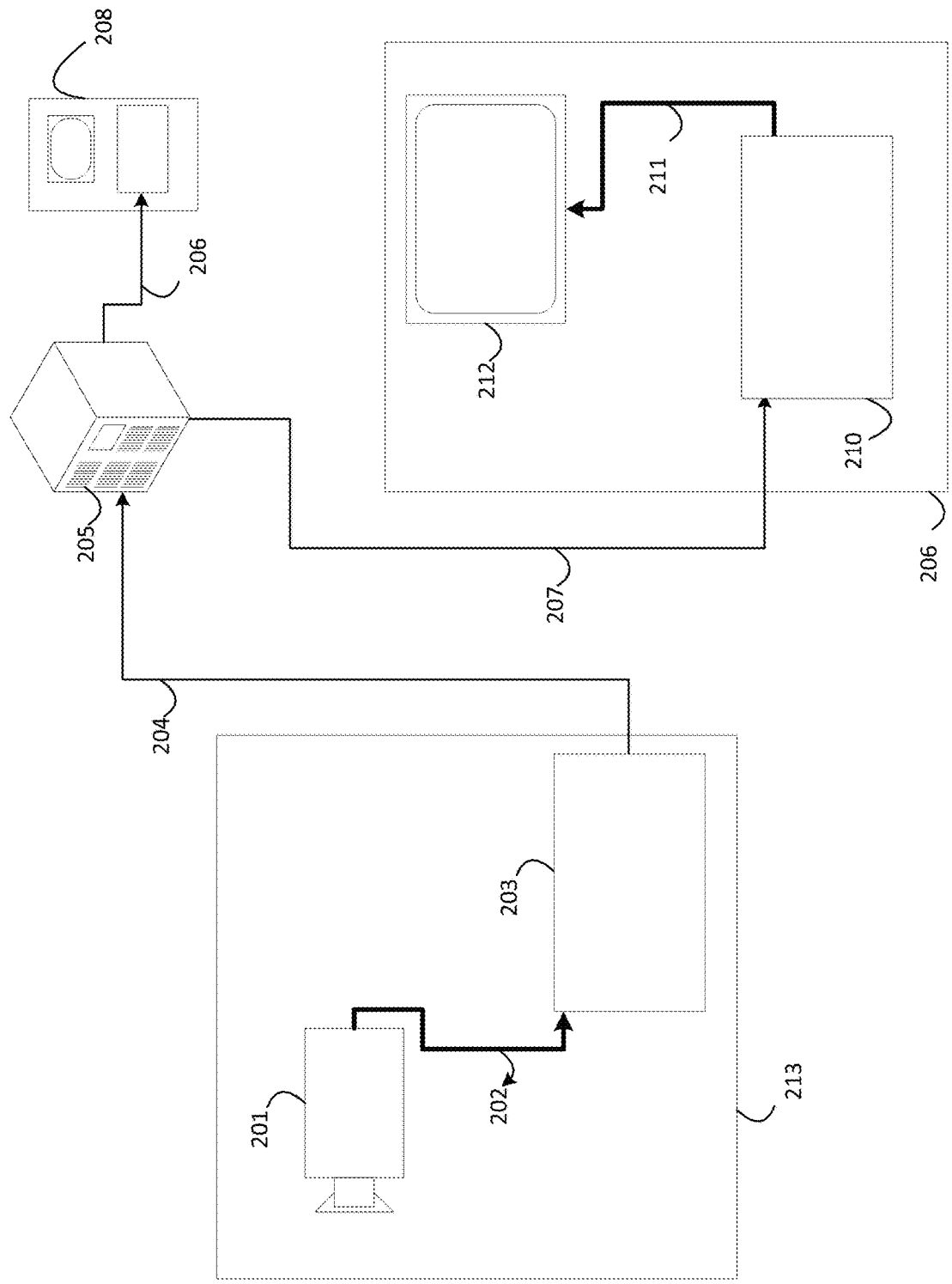
FIG. 2 is a schematic illustration of a simplified block diagram of a communication system in accordance with an embodiment.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (213), that can include a video source (201), for example a digital camera, creating a for example uncompressed video sample stream (202). That sample stream (202), depicted as a bold line to emphasize a high data volume when compared to encoded video bitstreams, can be processed by an encoder (203) coupled to the camera (201). The encoder (203) can include hardware, software, or a combination thereof to enable or implement aspects of the disclosed subject matter as described in more detail below. The encoded video bitstream (204), depicted as a thin line to emphasize the lower data volume when compared to the sample stream, can be stored on a streaming server (205) for future use. One or more streaming clients (206, 208) can access the streaming server (205) to retrieve copies (207, 209) of the encoded video bitstream (204). A client (206) can include a video decoder (210) which decodes the incoming copy of the encoded video bitstream (207) and creates an outgoing video sample stream (211) that can be rendered on a display (212) or other rendering device (not depicted). In some streaming systems, the video bitstreams (204, 207, 209) can be encoded according to certain video coding/compression standards. Examples of those standards include ITU-T Recommendation H.265. Under development is a video coding standard informally known as Versatile Video Coding or VVC. The disclosed subject matter may be used in the context of VVC.

Figure 3:
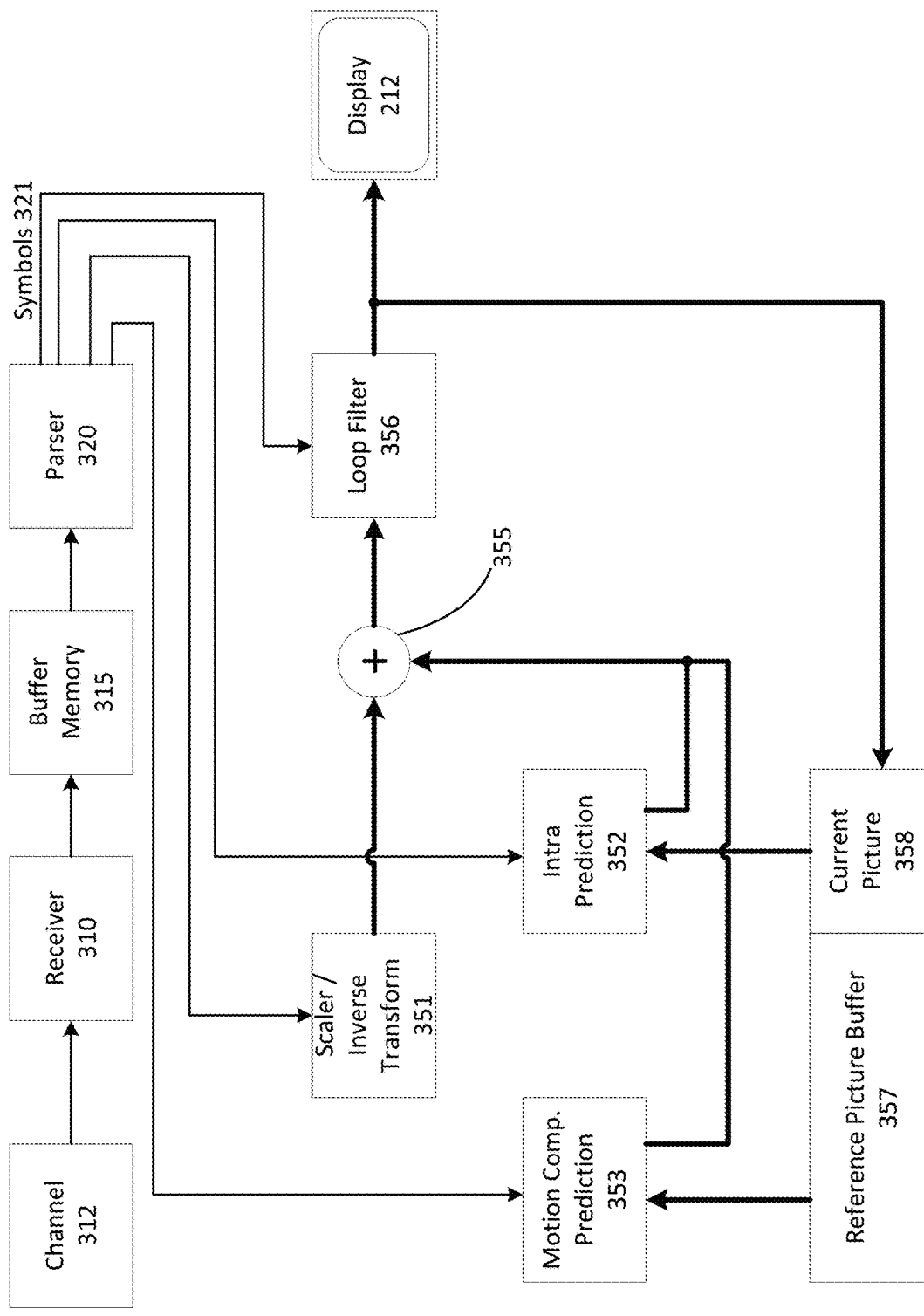
FIG. 3 is a schematic illustration of a simplified block diagram of a decoder in accordance with an embodiment.

FIG. 3 may be a functional block diagram of a video decoder (210) according to an embodiment of the present disclosure.

A receiver (310) may receive one or more codec video sequences to be decoded by the decoder (210); in the same or another embodiment, one coded video sequence at a time, where the decoding of each coded video sequence is independent from other coded video sequences. The coded video sequence may be received from a channel (312), which may be a hardware/software link to a storage device which stores the encoded video data. The receiver (310) may receive the encoded video data with other data, for example, coded audio data and/or ancillary data streams, that may be forwarded to their respective using entities (not depicted). The receiver (310) may separate the coded video sequence from the other data. To combat network jitter, a buffer memory (315) may be coupled in between receiver (310) and entropy decoder/parser (320) ("parser" henceforth). When receiver (310) is receiving data from a store/forward device of sufficient bandwidth and controllability, or from an isosychronous network, the buffer (315) may not be needed, or can be small. For use on best effort packet networks such as the Internet, the buffer (315) may be required, can be comparatively large and can advantageously of adaptive size.

The video decoder (210) may include a parser (320) to reconstruct symbols (321) from the entropy coded video sequence. Categories of those symbols include information used to manage operation of the decoder (210), and potentially information to control a rendering device such as a display (212) that is not an integral part of the decoder but can be coupled to it, as was shown in FIG. 3. The control information for the rendering device(s) may be in the form of Supplementary Enhancement Information (SEI messages) or Video Usability Information (VUI) parameter set fragments (not depicted). The parser (320) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameter corresponding to the group. Subgroups can include Groups of Pictures (GOPs), pictures, sub-pictures, tiles, slices, bricks, macroblocks, Coding Tree Units (CTUs) Coding Units (CUs), blocks, Transform Units (TUs), Prediction Units (PUs) and so forth. A tile may indicate a rectangular region of CU/CTUs within a particular tile column and row in a picture. A brick may indicate a rectangular region of CU/CTU rows within a particular tile. A slice may indicate one or more bricks of a picture, which are contained in an NAL unit. A sub-picture may indicate an rectangular region of one or more slices in a picture. The entropy decoder/parser may also extract from the coded video sequence information such as transform coefficients, quantizer parameter values, motion vectors, and so forth.

The parser (320) may perform entropy decoding/parsing operation on the video sequence received from the buffer (315), so to create symbols (321).

Reconstruction of the symbols (321) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (320). The flow of such subgroup control information between the parser (320) and the multiple units below is not depicted for clarity.

Beyond the functional blocks already mentioned, decoder 210 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (351). The scaler/inverse transform unit (351) receives quantized transform coefficient as well as control information, including which transform to use, block size, quantization factor, quantization scaling matrices, etc. as symbol(s) (321) from the parser (320). It can output blocks comprising sample values, that can be input into aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current (partly reconstructed) picture (358). The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a Motion Compensation Prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (321) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video bitstream and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to the render device (212) as well as stored in the reference picture memory for use in future inter-picture prediction.

Certain coded pictures, once fully reconstructed, can be used as reference pictures for future prediction. Once a coded picture is fully reconstructed and the coded picture has been identified as a reference picture (by, for example, parser (320)), the current reference picture (358) can become part of the reference picture buffer (357), and a fresh current picture memory can be reallocated before commencing the reconstruction of the following coded picture.

The video decoder 210 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (310) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or SNR enhancement layers, redundant slices, redundant pictures, forward error correction codes, and so on.

Figure 4:
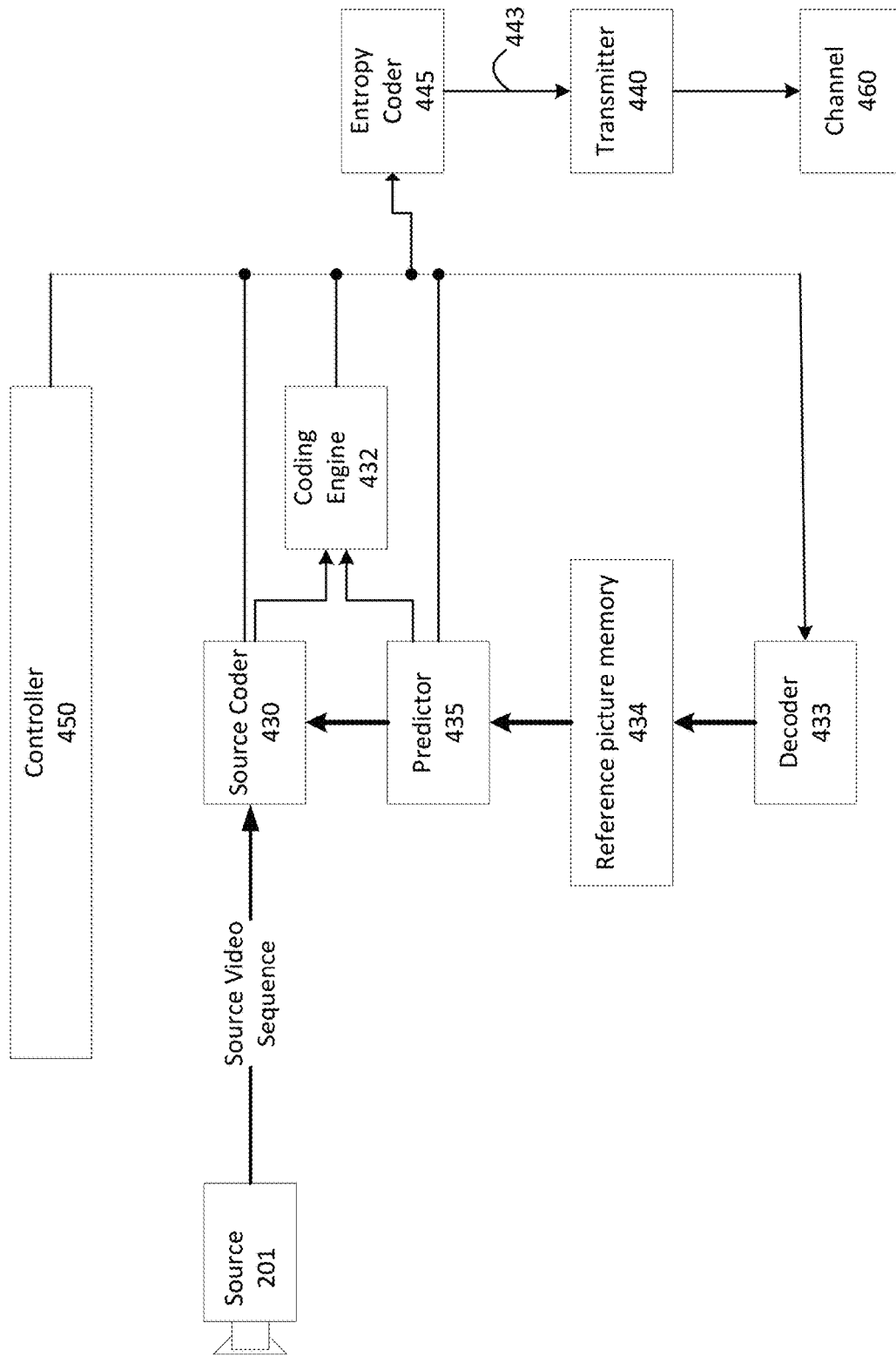
FIG. 4 is a schematic illustration of a simplified block diagram of an encoder in accordance with an embodiment.

FIG. 4 may be a functional block diagram of a video encoder (203) according to an embodiment of the present disclosure.

The encoder (203) may receive video samples from a video source (201) (that is not part of the encoder) that may capture video image(s) to be coded by the encoder (203).

The video source (201) may provide the source video sequence to be coded by the encoder (203) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (201) may be a storage device storing previously prepared video. In a videoconferencing system, the video source (203) may be a camera that captures local image information as a video sequence. Video data may be provided as a plurality of individual pictures that impart motion when viewed in sequence. The pictures themselves may be organized as a spatial array of pixels, wherein each pixel can comprise one or more sample depending on the sampling structure, color space, etc. in use. A person skilled in the art can readily understand the relationship between pixels and samples. The description below focusses on samples.

According to an embodiment, the encoder (203) may code and compress the pictures of the source video sequence into a coded video sequence (443) in real time or under any other time constraints as required by the application. Enforcing appropriate coding speed is one function of Controller (450). Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (450) as they may pertain to video encoder (203) optimized for a certain system design.

Some video encoders operate in what a person skilled in the are readily recognizes as a "coding loop". As an oversimplified description, a coding loop can consist of the encoding part of an encoder (430) ("source coder" henceforth) (responsible for creating symbols based on an input picture to be coded, and a reference picture(s)), and a (local) decoder (433) embedded in the encoder (203) that reconstructs the symbols to create the sample data a (remote) decoder also would create (as any compression between symbols and coded video bitstream is lossless in the video compression technologies considered in the disclosed subject matter). That reconstructed sample stream is input to the reference picture memory (434). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (433) can be the same as of a "remote" decoder (210), which has already been described in detail above in conjunction with FIG. 3. Briefly referring also to FIG. 4, however, as symbols are available and en/decoding of symbols to a coded video sequence by entropy coder (445) and parser (320) can be lossless, the entropy decoding parts of decoder (210), including channel (312), receiver (310), buffer (315), and parser (320) may not be fully implemented in local decoder (433).

An observation that can be made at this point is that any decoder technology except the parsing/entropy decoding that is present in a decoder also necessarily needs to be present, in substantially identical functional form, in a corresponding encoder. For this reason, the disclosed subject matter focusses on decoder operation. The description of encoder technologies can be abbreviated as they are the inverse of the comprehensively described decoder technologies. Only in certain areas a more detail description is required and provided below.

As part of its operation, the source coder (430) may perform motion compensated predictive coding, which codes an input frame predictively with reference to one or more previously-coded frames from the video sequence that were designated as "reference frames." In this manner, the coding engine (432) codes differences between pixel blocks of an input frame and pixel blocks of reference frame(s) that may be selected as prediction reference(s) to the input frame.

The local video decoder (433) may decode coded video data of frames that may be designated as reference frames, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference frames and may cause reconstructed reference frames to be stored in the reference picture cache (434). In this manner, the encoder (203) may store copies of reconstructed reference frames locally that have common content as the reconstructed reference frames that will be obtained by a far-end video decoder (absent transmission errors).

The predictor (435) may perform prediction searches for the coding engine (432). That is, for a new frame to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the video coder (430), including, for example, setting of parameters and subgroup parameters used for encoding the video data.

Output of all aforementioned functional units may be subjected to entropy coding in the entropy coder (445). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (440) may buffer the coded video sequence(s) as created by the entropy coder (445) to prepare it for transmission via a communication channel (460), which may be a hardware/software link to a storage device which would store the encoded video data. The transmitter (440) may merge coded video data from the video coder (430) with other data to be transmitted, for example, coded audio data and/or ancillary data streams (sources not shown).

The controller (450) may manage operation of the encoder (203). During coding, the controller (450) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block.

Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (203) may perform coding operations according to a predetermined video coding technology or standard, such as ITU-T Rec. H.265. In its operation, the video coder (203) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The video coder (430) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

VVC draft 7 has adopted technologies that assume that a video sequence to be encoded has multiple color planes and the color planes may be encoded jointly. However, in some situations, either when the video is monochrome, or when the color planes of the video are required to be encoded independently, then these joint color plane coding tools are no longer applicable. In order to support these situations, embodiments provide syntax and semantics, that are beyond the VCC draft 7, to disable these joint color plane coding tools when needed.

VVC Draft 7 intends to support the coding of monochrome video and the coding of the three colour components of the 4:4:4 chroma format video separately. In order to support these applications, VCC Draft 7 defined a variable called ChromaArrayType to enable or disable the related coding tools that are or are not applicable when the input video is monochrome and when the colour components of the video are required to be encode separately and independently.

In VVC Draft 7, depending on the value of separate_colour_plane_flag, the value of the variable ChromaArrayType is assigned as follows: If separate_colour_plane_flag is equal to 0, ChromaArrayType is set equal to chroma_format_idc. Otherwise, if separate_colour_plane_flag is equal to 1, ChromaArrayType is set equal to 0.

When ChromaArrayType is 0, this may mean that the input video is either monochrome or 4:4:4 with separately coded colour planes. VVC Draft 7 intends to disable the coding tools that are not applicable to monochrome video and to the video that required to encode each colour component of the video as if each component is monochrome.

However, VCC Draft 7 is not able to disable some of these coding tools when ChromaArrayType is 0 such as the coding tools enabled by sps_joint_cbcr_enabled_flag or pps_joint_cbcr_qp_offset_present_flag. Embodiments relate to modifications to VVC Draft 7 to disable some coding tools whenever the input video is monochrome or 4:4:4 with separately coded colour planes.

The syntax in VVC Draft 7 is italicized in the following Table 1, Table 2, and Table 3.

TABLE 1

Sequence parameter set RBSP syntax from VVC Draft 7

| | Descriptor |
|---|---|
| seq_parameter_set_rbsp( ) { | |
|   sps_decoding_parameter_set_id | u(4) |
|   sps_video_parameter_set_id | u(4) |
|   sps_max_sub_layers_minus1 | u(3) |
|   sps_reserved_zero_4bits | u(4) |
|   sps_ptl_dpb_hrd_params_present_flag | u(1) |
|   if( sps_ptl_dpb_hrd_params_present_flag ) | |
|     profile_tier_level( 1, sps_max_sub_layers_minus1 ) | |
|   gdr_enabled_flag | u(1) |
|   sps_seq_parameter_set_id | u(4) |
|   chroma_format_idc | u(2) |
|   if( chroma_format_idc = = 3 ) | |
|     separate_colour_plane_flag | u(1) |
|   ref_pic_resampling_enabled_flag | u(1) |
|   sps_seq_parameter_set_id | ue(v) |
|   chroma_format_idc | ue(v) |
|   if( chroma_format_idc = = 3 ) | |
|     separate_colour_plane_flag | u(1) |
|   pic_width_max_in_luma_samples | ue(v) |
|   pic_height_max_in_luma_samples | ue(v) |
|   sps_log2_ctu_size_minus5 | u(2) |
|   subpics_present_flag | u(1) |
|     sps_num_subpics_minus1 | u(8) |
|     for( i = 0; i <= sps_num_subpics_minus1; i++ ) { | |
|       subpic_ctu_top_left_x[ i ] | u(v) |
|       subpic_ctu_top_left_y[ i ] | u(v) |
|       subpic_width_minus1[ i ] | u(v) |
|       subpic_height_minus1[ i ] | u(v) |
|       subpic_treated_as_pic_flag[ i ] | u(1) |
|       loop_filter_across_subpic_enabled_flag[ i ] | u(1) |
|     } | |
|   } | |
|   sps_subpic_id_present_flag | u(1) |
|   if( sps_subpics_id_present_flag ) { | |
|     sps_subpic_id_signalling_present_flag | u(1) |
|     if( sps_subpics_id_signalling_present_flag ) { | |
|       sps_subpic_id_len_minus1 | ue(v) |
|       for( i = 0; i <= sps_num_subpics_minus1; i++ ) | |
|         sps_subpic_id[ i ] | u(v) |
|     } | |
|   } | |
|   bit_depth_minus8 | ue(v) |
|   min_qp_prime_ts_minus4 | ue(v) |
|   sps_weighted_pred_flag | u(1) |
|   sps_weighted_bipred_flag | u(1) |
|   log2_max_pic_order_cnt_lsb_minus4 | u(4) |
|   sps_poc_msb_flag | u(1) |
|   if( sps_poc_msb_flag ) | |
|     poc_msb_len_minus1 | ue(v) |
|   if( sps_max_sub_layers_minus1 > 0 ) | |
|     sps_sub_layer_dpb_params_flag | u(1) |
|   if( sps_ptl_dpb_hrd_params_present_flag ) | |
|     dpb_parameters( 0, sps_max_sub_layers_minus1, sps_sub_layer_dpb_params_flag ) | |
|   long_term_ref_pics_flag | u(1) |
|   inter_layer_ref_pics_present_flag | u(1) |
|   sps_idr_rpl_present_flag | u(1) |
|   rpl1_same_as_rpl0_flag | u(1) |
|   for( i = 0; i < !rpl1_same_as_rpl0_flag ? 2 : 1; i++ ) | |
|     num_ref_pic_lists_in_sps[ i ] | ue(v) |
|     for( j = 0; j < num_ref_pic_lists_in_sps[ i ]; j++) | |
|       ref_pic_list_struct( i, j ) | |
| } | |

TABLE 1-continued

Sequence parameter set RBSP syntax from VVC Draft 7

| | Descriptor |
|---|---|
| if( ChromaArrayType != 0 ) | |
|     qtbtt_dual_tree_intra_flag | u(1) |
| log2_min_luma_coding_block_size_minus2 | ue(v) |
| partition_constraints_override_enabled_flag | u(1) |
| sps_log2_diff_min_qt_min_cb_intra_slice_luma | ue(v) |
| sps_log2_diff_min_qt_min_cb_inter_slice | ue(v) |
| sps_max_mtt_hierarchy_depth_inter_slice | ue(v) |
| sps_max_mtt_hierarchy_depth_intra_slice_luma | ue(v) |
| if( sps_max_mtt_hierarchy_depth_intra_slice_luma != 0 ) { | |
|     sps_log2_diff_max_bt_min_qt_intra_slice_luma | ue(v) |
|     sps_log2_diff_max_tt_min_qt_intra_slice_luma | ue(v) |
| } | |
| if( sps_max_mtt_hierarchy_depth_inter_slice != 0 ) { | |
|     sps_log2_diff_max_bt_min_qt_inter_slice | ue(v) |
|     sps_log2_diff_max_tt_min_qt_inter_slice | ue(v) |
| } | |
| if( qtbtt_dual_tree_intra_flag ) { | |
|     sps_log2_diff_min_qt_min_cb_intra_slice_chroma | ue(v) |
|     sps_max_mtt_hierarchy_depth_intra_slice_chroma | ue(v) |
|     if( sps_max_mtt_hierarchy_depth_intra_slice_chroma != 0 ) { | |
|         sps_log2_diff_max_bt_min_qt_intra_slice_chroma | ue(v) |
|         sps_log2_diff_max_tt_min_qt_intra_slice_chroma | ue(v) |
|     } | |
| } | |
| sps_max_luma_transform_size_64_flag | u(1) |
| *sps_joint_cbcr_enabled_flag* | u(1) |
| if( ChromaArrayType != 0 ) { | |
|     same_qp_table_for_chroma | u(1) |
|     numQpTables = same_qp_table_for_chroma ? 1 : ( sps_joint_cbcr_enabled_flag ? 3 : 2 ) | |
|     for( i = 0; i < numQpTables; i++ ) { | |
|         qp_table_start_minus26[ i ] | se(v) |
|         num_points_in_qp_table_minus1 [ i ] | ue(v) |
|         for( j = 0; j <= num_points_in_qp_table_minus1[ i ]; j++ ) { | |
|             delta_qp_in_val_minus1[ i ][ j ] | ue(v) |
|             delta_qp_diff_val[ i ][ j ] | ue(v) |
|         } | |
|     } | |
| } | |
| sps_sao_enabled_flag | u(1) |
| sps_alf_enabled_flag | u(1) |
| sps_transform_skip_enabled_flag | u(1) |
| if( sps_transform_skip_enabled_flag ) | |
|     sps_bdpcm_enabled_flag | u(1) |
| *if( sps_bdpcm_enabled_flag && chroma_format_idc == 3 )* | |
|     *sps_bdpcm_chroma_enabled_flag* | u(1) |
| sps_ref_wraparound_enabled_flag | u(1) |
| if( sps_ref_wraparound_enabled_flag ) | |
|     sps_ref_wraparound_offset_minus1 | ue(v) |
| sps_temporal_mvp_enabled_flag | u(1) |
| if( sps_temporal_mvp_enabled_flag ) | |
|     sps_sbtmvp_enabled_flag | u(1) |
| sps_amvr_enabled_flag | u(1) |
| sps_bdof_enabled_flag | u(1) |
| if( sps_bdof_enabled_flag ) | |
|     sps_bdof_pic_present_flag | u(1) |
| sps_smvd_enabled_flag | u(1) |
| sps_dmvr_enabled_flag | u(1) |
| if( sps_dmvr_enabled_flag) | |
|     sps_dmvr_pic_present_flag | u(1) |
| sps_mmvd_enabled_flag | u(1) |
| sps_isp_enabled_flag | u(1) |
| sps_mrl_enabled_flag | u(1) |
| sps_mip_enabled_flag | u(1) |
| if( ChromaArrayType != 0 ) | |
|     sps_cclm_enabled_flag | u(1) |
| if( sps_cclm_enabled_flag && chroma_format_idc == 1 ) | |
| [Ed. (JC): should sps_cclm_colocated_chroma_flag also be signalled for 422 case since it's used in the decoding process, to be confirmed] | |
|     sps_cclm_colocated_chroma_flag | u(1) |
| sps_mts_enabled_flag | u(1) |
| if( sps_mts_enabled_flag ) { | |
|     sps_explicit_mts_intra_enabled_flag | u(1) |
|     sps_explicit_mts_inter_enabled_flag | u(1) |
| } | |
| sps_sbt_enabled_flag | u(1) |
| sps_affine_enabled_flag | u(1) |
| if( sps_affine_enabled_flag ) { | |
|     sps_affine_type_flag | u(1) |
|     sps_affine_amvr_enabled_flag | u(1) |
|     sps_affine_prof_enabled_flag | u(1) |
|     if( sps_affine_prof_enabled_flag ) | |
|         sps_prof_pic_present_flag | u(1) |
| } | |
| *if( chroma_format_idc == 3 ) {* | |
|     *sps_palette_enabled_flag* | u(1) |
|     *sps_act_enabled_flag* | u(1) |
| *}* | |
| sps_bcw_enabled_flag | u(1) |
| sps_ibc_enabled_flag | u(1) |
| sps_ciip_enabled_flag | u(1) |
| if( sps_mmvd_enabled_flag ) | |
|     sps_fpel_mmvd_enabled_flag | u(1) |
| sps_triangle_enabled_flag | u(1) |
| sps_lmcs_enabled_flag | u(1) |
| sps_lfnst_enabled_flag | u(1) |
| sps_ladf_enabled_flag | u(1) |
| if( sps_ladf_enabled_flag) { | |
|     sps_num_ladf_intervals_minus2 | u(2) |
|     sps_ladf_lowest_interval_qp_offset | se(v) |
|     for( i = 0; i < sps_num_ladf_intervals_minus2 + 1; i++ ) { | |
|         sps_ladf_qp_offset[ i ] | se(v) |
|         sps_ladf_delta_threshold_minus1[ i ] | ue(v) |
|     } | |
| } | |
| sps_scaling_list_enabled_flag | u(1) |
| sps_loop_filter_across_virtual_boundaries_disabled_present_flag | u(1) |
| if( sps_loop_filter_across_virtual_boundaries_disabled_present_flag ) { | |
|     sps_num_ver_virtual_boundaries | u(2) |
|     for( i = 0; i < sps_num_ver_virtual_boundaries; i++ ) | |
|         sps_virtual_boundaries_pos_x[ i ] | u(13) |
|     sps_num_hor_virtual_boundaries | u(2) |
|     for( i = 0; i < sps_num_hor_virtual_boundaries; i++ ) | |
|         sps_virtual_boundaries_pos_y[ i ] | u(13) |
| } | |
| if( sps_ptl_dpb_hrd_params_present_flag ) { | |
|     sps_general_hrd_params_present_flag | u(1) |
|     if( sps_general_hrd_params_present_flag ) { | |
|         general_hrd_parameters( ) | |
|         if( sps_max_sub_layers_minus1 > 0 ) | |
|             sps_sub_layer_cpb_params_present_flag | u(1) |
|         firstSubLayer = sps_sub_layer_cpb_params_present_flag ? 0 : sps_max_sub_layers_minus1 | |
|         ols_hrd_parameters( firstSubLayer, sps_max_sub_layers_minus1 ) | |
|     } | |
| } | |
| vui_parameters_present_flag | u(1) |
| if( vui_parameters_present_flag ) | |
|     vui_parameters( ) | |
| sps_extension_flag | u(1) |
| if( sps_extension_flag ) | |
|     while( more_rbsp_data( ) ) | |
|         sps_extension_data_flag | u(1) |
| rbsp_trailing_bits( ) | |
| } | |

TABLE 2

Picture parameter set RBSP syntax from VVC Draft 7

| | Descriptor |
|---|---|
| pic_parameter_set_rbsp( ) { | |
|   pps_pic_parameter_set_id | ue(v) |
|   pps_seq_parameter_set_id | u(4) |
|   pic_width_in_luma_samples | ue(v) |
|   pic_height_in_luma_samples | ue(v) |
|   conformance_window_flag | u(1) |
|   if( conformance_window_flag ) { | |
|     conf_win_left_offset | ue(v) |
|     conf_win_right_offset | ue(v) |
|     conf_win_top_offset | ue(v) |
|     conf_win_bottom_offset | ue(v) |
|   } | |
|   scaling_window_flag | u(1) |
|   if( scaling_window_flag ) { | |
|     scaling_win_left_offset | ue(v) |
|     scaling_win_right_offset | ue(v) |
|     scaling_win_top_offset | ue(v) |
|     scaling_win_bottom_offset | ue(v) |
|   } | |
|   output_flag_present_flag | u(1) |
|   mixed_nalu_types_in_pic_flag | u(1) |
|   pps_subpic_id_signalling_present_flag | u(1) |
|   if( pps_subpics_id_signalling_present_flag ) { | |
|     pps_num_subpics_minus1 | ue(v) |
|     pps_subpic_id_len_minus1 | ue(v) |
|     for( i = 0; i <= pps_num_subpic_minus1; i++ ) | |
|       pps_subpic_id[ i ] | u(v) |
|   } | |
|   no_pic_partition_flag | u(1) |
|   if( !no_pic_partition_flag ) { | |
|     pps_log2_ctu_size_minus5 | u(2) |
|     num_exp_tile_columns_minus1 | ue(v) |
|     num_exp_tile_rows_minus1 | ue(v) |
|     for( i = 0; i <= num_exp_tile_columns_minus1; i++ ) | |
|       tile_column_width_minus1[ i ] | ue(v) |
|     for( i = 0; i <= num_exp_tile_rows_minus1; i++ ) | |
|       tile_row_height_minus1[ i ] | ue(v) |
|     rect_slice_flag | u(1) |
|     if( rect_slice_flag ) | |
|       single_slice_per_subpic_flag | u(1) |
|     if( rect_slice_flag && !single_slice_per_subpic_flag ) { | |
|       num_slices_in_pic_minus1 | ue(v) |
|       tile_idx_delta_present_flag | u(1) |
|       for( i = 0; i < num_slices_in_pic_minus1; i++ ) { | |
|         slice_width_in_tiles_minus1[ i ] | ue(v) |
|         slice_height_in_tiles_minus1[ i ] | ue(v) |
|         if( slice_width_in_tiles_minus1[ i ] = = 0 && | |
|           slice_height_in_tiles_minus1[ i ] = = 0 ) { | |
|           num_slices_in_tile_minus1[ i ] | ue(v) |
|           numSlicesInTileMinus1 = | |
|           num_slices_in_tile_minus1[ i ] | |
|           for( j = 0; j < numSlicesInTileMinus1; j++ ) | |
|             slice_height_in_ctu_minus1[ i++ ] | ue(v) |
|         } | |
|         if( tile_idx_delta_present_flag && i < | |
|           num_slices_in_pic_minus1 ) | |
|           tile_idx_delta[ i ] | se(v) |
|       } | |
|     } | |
|     loop_filter_across_tiles_enabled_flag | u(1) |
|     loop_filter_across_slices_enabled_flag | u(1) |
|   } | |
|   entropy_coding_sync_enabled_flag | u(1) |
|   if( !no_pic_partition_flag \|\| | |
|     entropy_coding_sync_enabled_flag ) | |
|     entry_point_offsets_present_flag | u(1) |
|   cabac_init_present_flag | u(1) |
|   for( i = 0; i < 2; i++ ) | |
|     num_ref_idx_default_active_minus1[ i ] | ue(v) |
|   rpl1_idx_present_flag | u(1) |
|   init_qp_minus26 | se(v) |
|   if( sps_transform_skip_enabled_flag ) | |
|     log2_transform_skip_max_size_minus2 | ue(v) |
|   cu_qp_delta_enabled_flag | u(1) |
|   *pps_cb_qp_offset* | se(v) |

TABLE 2-continued

Picture parameter set RBSP syntax from VVC Draft 7

| | Descriptor |
|---|---|
|   *pps_cr_qp_offset* | se(v) |
|   *pps_joint_cbcr_qp_offset_present_flag* | u(1) |
|   if( pps_joint_cbcr_qp_offset_present_flag ) | |
|     pps_joint_cbcr_qp_offset_value | se(v) |
|   *pps_slice_chroma_qp_offsets_present_flag* | u(1) |
|   *pps_cu_chroma_qp_offset_list_enabled_flag* | u(1) |
|   if( pps_cu_chroma_qp_offset_list_enabled_flag ) { | |
|     chroma_qp_offset_list_len_minus1 | ue(v) |
|     for( i = 0; i <= chroma_qp_offset_list_len_minus1; i++ ) { | |
|       cb_qp_offset_list_[ i ] | se(v) |
|       cr_qp_offset_list_[ i ] | se(v) |
|       if( pps_joint_cbcr_qp_offset_present_flag ) | |
|         joint_cbcr_qp_offset_list[ i ] | se(v) |
|     } | |
|   } | |
|   pps_weighted_pred_flag | u(1) |
|   pps_weighted_bipred_flag | u(1) |
|   deblocking_filter_control_present_flag | u(1) |
|   if( deblocking_filter_control_present_flag ) { | |
|     deblocking_filter_override_enabled_flag | u(1) |
|     pps_deblocking_filter_disabled_flag | u(1) |
|     if( !pps_deblocking_filter_disabled_flag ) { | |
|       pps_beta_offset_div2 | se(v) |
|       pps_tc_offset_div2 | se(v) |
|     } | |
|   } | |
|   constant_slice_header_params_enabled_flag | u(1) |
|   if( constant_slice_header_params_enabled_flag ) { | |
|     pps_dep_quant_enabled_idc | u(2) |
|     for( i = 0; i < 2; i++ ) | |
|       pps_ref_pic_list_sps_idc[ i ] | u(2) |
|     pps_mvd_l1_zero_idc | u(2) |
|     pps_collocated_from_l0_idc | u(2) |
|     pps_six_minus_max_num_merge_cand_plus1 | ue(v) |
|     pps_max_num_merge_cand_mi- | ue(v) |
|     nus_max_num_triangle_cand_plus1 | |
|   } | |
|   picture_header_extension_present_flag | u(1) |
|   slice_header_extension_present_flag | u(1) |
|   pps_extension_flag | u(1) |
|   if( pps_extension_flag ) | |
|     while( more_rbsp_data( ) ) | |
|       pps_extension_data_flag | u(1) |
|   rbsp_trailing_bits( ) | |
| } | |

TABLE 3

Adaptive loop filter data syntax from VVC Draft 7

| | Descriptor |
|---|---|
| alf_data( ) { | |
|   alf_luma_filter_signal_flag | u(1) |
|   *alf_chroma_filter_signal_flag* | u(1) |
|   if( alf_luma_filter_signal_flag ) { | |
|     alf_luma_clip_flag | u(1) |
|     alf_luma_num_filters_signalled_minus1 | ue(v) |
|     if( alf_luma_num_filters_signalled_minus1 > 0 ) { | |
|       for( filtIdx = 0; filtIdx < NumAlfFilters; filtIdx++ ) | |
|         alf_luma_coeff_delta_idx[ filtIdx ] | u(v) |
|     } | |
|     for( sfIdx = 0; sfIdx <= alf_luma num filters | |
| signalled minus1 ; sfIdx++ ) { | |
|       for( j = 0; j < 12; j++ ) { | |
|         alf_luma_coeff_abs[ sfIdx ][ j ] | uek(v) |
|         if( alf_luma_coeff_abs[ sfIdx ][ j ] ) | |
|           alf_luma_coeff_sign[ sfIdx ][ j ] | u(1) |
|       } | |
|     } | |
|     if( alf_luma_clip_flag ) { | |
|       for( sfIdx = 0; sfIdx <= alf_luma_num_filters_ | |

TABLE 3-continued

Adaptive loop filter data syntax from VVC Draft 7

| | Descriptor |
|---|---|
| signalled_minus1; sfIdx++ ) { | |
|     for( j = 0; j < 12; j++ ) | |
|         alf_luma_clip_idx[ sfIdx ][ j ] | u(2) |
|     } | |
|   } | |
| } | |
| if( alf_chroma_filter_signal_flag ) { | |
|     alf_chroma_num_alt_filters_minus1 | ue(v) |
|     for( altIdx = 0; altIdx <= alf_chroma_num_alt_filters_minus1 ; altIdx++ ) | |
|     { | |
|         alf_chroma_clip_flag[ altIdx ] | u(1) |
|         for( j = 0; j < 6; j++ ) { | |
|             alf_chroma_coeff_abs[ altIdx ][ j ] | uek(v) |
|             if( alf_chroma_coeff_abs[ altIdx ][ j ] > 0 ) | |
|                 alf_chroma_coeff_sign[ altIdx ][ j ] | u(1) |
|         } | |
|         if( alf_chroma_clip_flag[ altIdx ] ) { | |
|             for( j = 0; j < 6; j++ ) | |
|                 alf_chroma_clip_idx[ altIdx ][ j ] | u(2) |
|         } | |
|     } | |
| } | |
| } | |

Embodiments may relate to handling the sps_joint_cbcr_enabled_flag when ChromaArrayType equals to 0 as follows. As shown in Table 4, when ChromaArrayType equals to 0, sps_joint_cbcr_enabled_flag is not parsed and inferred to be 0 such that joint Cb and Cr residual coding as a chroma residual coding is disabled to avoid unnecessary decoding processes. The text changes are highlighted in italics and texts <<inside double angle brackets>> indicates deleted texts.

TABLE 4

Handling on sps_joint_cbcr_enabled_flag

| | Descriptor |
|---|---|
| seq_parameter_set_rbsp( ) { | |
| ... | |
|   << sps_joint_cbcr_enabled_flag>> | <<u(1)>> |
|   *if( ChromaArrayType != 0 ) {* | *u(1)* |
|     *sps_joint_cbcr_enabled_flag* | |
|     same_qp_table_for_chroma | u(1) |
|     numQpTables = same_qp_table_for_chroma ? 1 : ( sps_joint_cbcr_enabled_flag ? 3 : 2 ) | |
|     for( i = 0; i < numQpTables; i++ ) { | |
|         qp_table_start_minus26[ i ] | se(v) |
|         num_points_in_qp_table_minus1[ i ] | ue(v) |
|         for( j = 0; j <= num_points_in_qp_table_minus1[ i ]; j++ ) { | |
|             delta_qp_in_val_minus1[ i ][ j ] | ue(v) |
|             delta_qp_diff_val[ i ][ j ] | ue(v) |
|         } | |
|     } | |
|   } | |
| ... | |
| } | | sps_joint_cbcr_enabled_flag equal to 0 may specify that the joint coding of chroma residuals is disabled. sps_joint_cbcr_enabled_flag equal to 1 may specify that the joint coding of chroma residuals is enabled. When sps_joint_cbcr_enabled_flag is not present, it may be inferred to be equal to 0.

When ChromaArrayType is 0, a video component shall be encoded as if it is monochrome or 4:4:4 with separately coded colour planes. As shown in the italicized syntax in Table 1, Table 2 and 3, the syntax elements pps_cb_qp_offset, pps_cr_qp_offset, pps_joint_cbcr_qp_offset_present_flag, pps_slice_chroma_qp_offsets_present_flag, pps_cu_chroma_qp_offset_list_enabled_flag, alf_chroma_filter_signal_flag are signaled independently on ChromaArrayType. When ChromaArrayType is 0, these flags could have a value of 1 which enables coding tools that are not applicable to encoding a video component as if it is monochrome or 4:4:4 with separately coded colour planes. This results in conflicting signaling between ChromaArrayType and the abovementioned syntax elements.

To ensure there are no conflicts in the signaling between ChromaArrayType and the related syntax elements, embodiments relate to modifications to a syntax of a sequence parameter set RBSP, a picture parameter set RBSP syntax and adaptive loop filter data syntax.

Embodiments are described in the form of text modifications relative to the specification text of VVC Draft 7 shown below Table 5, Table 6, Table 7, and Table 8. The text changes are highlighted in italics.

TABLE 5

Modified sequence parameter set RBSP syntax

| | Descriptor |
|---|---|
| seq_parameter_set_rbsp( ) { | |
|   sps_decoding_parameter_set_id | u(4) |
|   sps_video_parameter_set_id | u(4) |
|   sps_max_sub_layers_minus1 | u(3) |
|   sps_reserved_zero_4bits | u(4) |
|   sps_ptl_dpb_hrd_params_present_flag | u(1) |
|   if( sps_ptl_dpb_hrd_params_present_flag ) | |
|     profile_tier_level( 1, sps_max_sub_layers_minus1 ) | |
|   gdr_enabled_flag | u(1) |
|   sps_seq_parameter_set_id | u(4) |
|   chroma_format_idc | u(2) |
|   if( chroma_format_idc = = 3 ) | |
|     separate_colour_plane_flag | u(1) |
|   ref_pic_resampling_enabled_flag | u(1) |
|   pic_width_max_in_luma_samples | ue(v) |
|   pic_height_max_in_luma_samples | ue(v) |
|   sps_log2_ctu_size_minus5 | u(2) |
|   subpics_present_flag | u(1) |
|     sps_num_subpics_minus1 | u(8) |
|     for( i = 0; i <= sps_num_subpics_minus1; i++ ) { | |
|         subpic_ctu_top_left_x[ i ] | u(v) |
|         subpic_ctu_top_left_y[ i ] | u(v) |
|         subpic_width_minus1[ i ] | u(v) |
|         subpic_height_minus1[ i ] | u(v) |
|         subpic_treated_as_pic_flag[ i ] | u(1) |
|         loop_filter_across_subpic_enabled_flag[ i ] | u(1) |
|     } | |
|   } | |
|   sps_subpic_id_present_flag | u(1) |
|   if( sps_subpics_id_present_flag ) { | |
|     sps_subpic_id_signalling_present_flag | u(1) |
|     if( sps_subpics_id_signalling_present_flag ) { | |
|         sps_subpic_id_len_minus1 | ue(v) |
|         for( i = 0; i <= sps_num_subpics_minus1; i++ ) | |
|             sps_subpic_id[ i ] | u(v) |
|     } | |
|   } | |
|   bit_depth_minus8 | ue(v) |
|   min_qp_prime_ts_minus4 | ue(v) |
|   sps_weighted_pred_flag | u(1) |
|   sps_weighted_bipred_flag | u(1) |
|   log2_max_pic_order_cnt_lsb_minus4 | u(4) |
|   sps_poc_msb_flag | u(1) |
|   if( sps_poc_msb_flag ) | |
|     poc_msb_len_minus1 | ue(v) |
|   if( sps_max_sub_layers_minus1 > 0 ) | |
|     sps_sub_layer_dpb_params_flag | u(1) |
|   if( sps_ptl_dpb_hrd_params_present_flag ) | |

TABLE 5-continued

Modified sequence parameter set RBSP syntax

| | Descriptor |
|---|---|
| dpb_parameters( 0, sps_max_sub_layers_minus1, sps_sub_layer_dpb_params_flag ) | |
| long_term_ref_pics_flag | u(1) |
| inter_layer_ref_pics_present_flag | u(1) |
| sps_idr_rpl_present_flag | u(1) |
| rpl1_same_as_rpl0_flag | u(1) |
| for( i = 0; i < !rpl1_same_as_rpl0_flag ? 2 : 1; i++ ) { | |
|   num_ref_pic_lists_in_sps[ i ] | ue(v) |
|   for( j = 0; j < num_ref_pic_lists_in_sps[ i ]; j++) | |
|     ref_pic_list_struct( i, j ) | |
| } | |
| if( ChromaArrayType != 0 ) | |
|   qtbtt_dual_tree_intra_flag | u(1) |
| log2_min_luma_coding_block_size_minus2 | ue(v) |
| partition_constraints_override_enabled_flag | u(1) |
| sps_log2_diff_min_qt_min_cb_intra_slice_luma | ue(v) |
| sps_log2_diff_min_qt_min_cb_inter_slice | ue(v) |
| sps_max_mtt_hierarchy_depth_inter_slice | ue(v) |
| sps_max_mtt_hierarchy_depth_intra_slice_luma | ue(v) |
| if( sps_max_mtt_hierarchy_depth_intra_slice_luma != 0 ) { | |
|   sps_log2_diff_max_bt_min_qt_intra_slice_luma | ue(v) |
|   sps_log2_diff_max_tt_min_qt_intra_slice_luma | ue(v) |
| } | |
| if( sps_max_mtt_hierarchy_depth_inter_slice != 0 ) { | |
|   sps_log2_diff_max_bt_min_qt_inter_slice | ue(v) |
|   sps_log2_diff_max_tt_min_qt_inter_slice | ue(v) |
| } | |
| if( qtbtt_dual_tree_intra_flag ) { | |
|   sps_log2_diff_min_qt_min_cb_intra_slice_chroma | ue(v) |
|   sps_max_mtt_hierarchy_depth_intra_slice_chroma | ue(v) |
|   if( sps_max_mtt_hierarchy_depth_intra_slice_chroma != 0 ) { | |
|     sps_log2_diff_max_bt_min_qt_intra_slice_chroma | ue(v) |
|     sps_log2_diff_max_tt_min_qt_intra_slice_chroma | ue(v) |
|   } | |
| } | |
| sps_max_luma_transform_size_64_flag | u(1) |
| if( ChromaArrayType != 0 ) { | u(1) |
|   sps_joint_cbcr_enabled_flag | |
|   same_qp_table_for_chroma | u(1) |
|   numQpTables = same_qp_table_for_chroma ? 1 : ( sps_joint_cbcr_enabled_flag ? 3 : 2 ) | |
|   for( i = 0; i < numQpTables; i++) { | |
|     qp_table_start_minus26[ i ] | se(v) |
|     num_points_in_qp_table_minus1[ i ] | ue(v) |
|     for( j = 0; j <= num_points_in_qp_table_minus1[ i ]; j++ ) { | |
|       delta_qp_in_val_minus1[ i ][ j ] | ue(v) |
|       delta_qp_diff_val[ i ][ j ] | ue(v) |
|     } | |
|   } | |
| } | |
| sps_sao_enabled_flag | u(1) |
| sps_alf_enabled_flag | u(1) |
| sps_transform_skip_enabled_flag | u(1) |
| if( sps_transform_skip_enabled_flag ) | |
|   sps_bdpcm_enabled_flag | u(1) |
| *if( sps_bdpcm_enabled_flag && ChromaArrayType= =3)* | |
|   sps_bdpcm_chroma_enabled_flag | u(1) |
| sps_ref_wraparound_enabled_flag | u(1) |
| if( sps_ref_wraparound_enabled_flag ) | |
|   sps_ref_wraparound_offset_minus1 | ue(v) |
| sps_temporal_mvp_enabled_flag | u(1) |
| if( sps_temporal_mvp_enabled_flag ) | |
|   sps_sbtmvp_enabled_flag | u(1) |
| sps_amvr_enabled_flag | u(1) |
| sps_bdof_enabled_flag | u(1) |
| if( sps_bdof_enabled_flag ) | |
|   sps_bdof_pic_present_flag | u(1) |
| sps_smvd_enabled_flag | u(1) |
| sps_dmvr_enabled_flag | u(1) |
| if( sps_dmvr_enabled_flag) | |
|   sps_dmvr_pic_present_flag | u(1) |
| sps_mmvd_enabled_flag | u(1) |
| sps_isp_enabled_flag | u(1) |
| sps_mrl_enabled_flag | u(1) |
| sps_mip_enabled_flag | u(1) |
| if( ChromaArrayType != 0 ) | |
|   sps_cclm_enabled_flag | u(1) |
| if( sps_cclm_enabled_flag && chroma_format_idc = = 1 ) | |
| [Ed. (JC): should_sps_cclm_colocated_chroma_flag also be signalled for 422 case since it's used in the decoding process, to be confirmed] | |
|   sps_cclm_colocated_chroma_flag | u(1) |
| sps_mts_enabled_flag | u(1) |
| if( sps_mts_enabled_flag ) { | |
|   sps_explicit_mts_intra_enabled_flag | u(1) |
|   sps_explicit_mts_inter_enabled_flag | u(1) |
| } | |
| sps_sbt_enabled_flag | u(1) |
| sps_affine_enabled_flag | u(1) |
| if( sps_affine_enabled_flag ) { | |
|   sps_affine_type_flag | u(1) |
|   sps_affine_amvr_enabled_flag | u(1) |
|   sps_affine_prof_enabled_flag | u(1) |
|   if( sps_affine_prof_enabled_flag ) | |
|     sps_prof_pic_present_flag | u(1) |
| } | |
| *if( ChromaArrayType = = 3 ) {* | |
|   *sps_palette_enabled_flag* | u(1) |
|   *sps_act_enabled_flag* | u(1) |
| *}* | |
| sps_bcw_enabled_flag | u(1) |
| sps_ibc_enabled_flag | u(1) |
| sps_ciip_enabled_flag | u(1) |
| if( sps_mmvd_enabled_flag ) | |
|   sps_fpel_mmvd_enabled_flag | u(1) |
| sps_triangle_enabled_flag | u(1) |
| sps_lmcs_enabled_flag | u(1) |
| spsfinst_enabled_flag | u(1) |
| sps_ladf_enabled_flag | u(1) |
| if( sps_ladf_enabled_flag ) { | |
|   sps_num_ladf_intervals_minus2 | u(2) |
|   sps_ladf_lowest_interval_qp_offset | se(v) |
|   for( i = 0; i < sps_num_ladf_intervals_minus2 + 1; i++) { | |
|     sps_ladf_qp_offset[ i ] | se(v) |
|     sps_ladf_delta_threshold_minus1 [ i ] | ue(v) |
|   } | |
| } | |
| sps_scaling_list_enabled_flag | u(1) |
| sps_loop_filter_across_virtual_boundaries_disabled_present_flag | u(1) |
| if( sps_loop_filter_across_virtual_boundaries_disabled_present_flag ) { | |
|   sps_num_ver_virtual_boundaries | u(2) |
|   for( i = 0; i < sps_num_ver_virtual_boundaries; i++ ) | |
|     sps_virtual_boundaries_pos_x[ i ] | u(13) |
|   sps_num_hor_virtual_boundaries | u(2) |
|   for( i = 0; i < sps_num_hor_virtual_boundaries; i++ ) | |
|     sps_virtual_boundaries_pos_y[ i ] | u(13) |
| } | |
| if( sps_ptl_dpb_hrd_params_present_flag ) { | |
|   sps_general_hrd_params_present_flag | u(1) |
|   if( sps_general_hrd_params_present_flag ) { | |
|     general_hrd_parameters( ) | |
|     if( sps_max_sub_layers_minus1 > 0 ) | |
|       sps_sub_layer_cpb_params_present_flag | u(1) |
|     firstSubLayer = sps_sub_layer_cpb_params_present_flag ? 0 : sps_max_sub_layers_minus1 | |
|     ols_hrd_parameters( firstSubLayer, sps_max_sub_layers_minus1 ) | |
|   } | |
| } | |
| vui_parameters_present_flag | u(1) |
| if( vui_parameters_present_flag) | |
|   vui_parameters( ) | |
| sps_extension_flag | u(1) |
| if( sps_extension_flag) | |
|   while( more_rbsp_data( ) ) | |

TABLE 5-continued

Modified sequence parameter set RBSP syntax

| | Descriptor |
|---|---|
|     sps_extension_data_flag | u(1) |
| rbsp_trailing_bits( ) | |
| } | |

TABLE 6

Modification to picture parameter set RBSP syntax from VVC Draft 7

| | Descriptor |
|---|---|
| pic_parameter_set_rbsp( ) { | |
|   pps_pic_parameter_set_id | ue(v) |
|   pps_seq_parameter_set_id | u(4) |
|   pic_width_in_luma_samples | ue(v) |
|   pic_height_in_luma_samples | ue(v) |
|   conformance_window_flag | u(1) |
|   if( conformance_window_flag ) { | |
|     conf_win_left_offset | ue(v) |
|     conf_win_right_offset | ue(v) |
|     conf_win_top_offset | ue(v) |
|     conf_win_bottom_offset | ue(v) |
|   } | |
|   scaling_window_flag | u(1) |
|   if( scaling_window_flag ) { | |
|     scaling_win_left_offset | ue(v) |
|     scaling_win_right_offset | ue(v) |
|     scaling_win_top_offset | ue(v) |
|     scaling_win_bottom_offset | ue(v) |
|   } | |
|   output_flag_present_flag | u(1) |
|   mixed_nalu_types_in_pic_flag | u(1) |
|   pps_subpic_id_signalling_present_flag | u(1) |
|   if( pps_subpics_id_signalling_present_flag ) { | |
|     pps_num_subpics_minus1 | ue(v) |
|     pps_subpic_id_len_minus1 | ue(v) |
|     for( i = 0; i <= pps_num_subpic_minus1; i++ ) | |
|       pps_subpic_id[ i ] | u(v) |
|   } | |
|   no_pic_partition_flag | u(1) |
|   if( !no_pic_partition_flag ) { | |
|     pps_log2_ctu_size_minus5 | u(2) |
|     num_exp_tile_columns_minus1 | ue(v) |
|     num_exp_tile_rows_minus1 | ue(v) |
|     for( i = 0; i <= num_exp_tile_columns_minus1; i++ ) | |
|       tile_column_width_minus1[ i ] | ue(v) |
|     for( i = 0; i <= num_exp_tile_rows_minus_1; i++ ) | |
|       tile_row_height_minus1[ i ] | ue(v) |
|     rect_slice_flag | u(1) |
|     if( rect_slice_flag) | |
|       single_slice_per_subpic_flag | u(1) |
|     if( rect_slice_flag && !single_slice_per_subpic_flag ) { | |
|       num_slices_in_pic_minus1 | ue(v) |
|       tile_idx_delta_present_flag | u(1) |
|       for( i = 0; i < num_slices_in_pic_minus1; i++ ) { | |
|         slice_width_in_tiles_minus1[ i ] | ue(v) |
|         slice_height_in_tiles_minus1[ i ] | ue(v) |
|         if( slice_width_in_tiles_minus1[ i ] == 0 && | |
|           slice_height_in_tiles_minus1[ i ] == 0 ) { | |
|           num_slices_in_tile_minus1[ i ] | ue(v) |
|           numSlicesInTileMinus1 = num_slices_in_tile_minus1[ i ] | |
|           for( j = 0; j < numSlicesInTileMinus1; j++ ) | |
|             slice_height_in_ctu_minus1[ i ] | ue(v) |
|         } | |
|         if( tile_idx delta_present_flag && i < num_slices_in_pic_minus1 ) | |
|           tile_idx_delta[ i ] | se(v) |
|       } | |
|     } | |
|     loop_filter_across_tiles_enabled_flag | u(1) |
|     loop_filter_across_slices_enabled_flag | u(1) |
|   } | |
|   entropy_coding_sync_enabled_flag | u(1) |
|   if( !no_pic_partition_flag \|\| entropy_coding_sync_enabled_flag ) | |
|     entry_point_offsets_present_flag | u(1) |
|   cabac_init_present_flag | u(1) |
|   for( i = 0; i < 2; i++ ) | |
|     num_ref_idx_default_active_minus1[ i ] | ue(v) |
|   rpl1_idx_present_flag | u(1) |
|   init_qp_minus26 | se(v) |
|   if( sps_transform_skip_enabled_flag ) | |
|     log2_transform_skip_max_size_minus2 | ue(v) |
|   cu_qp_delta_enabled_flag | u(1) |
|   *pps_chroma_present_flag* | *u(1)* |
|   *if( pps_chroma_present_flag ) {* | |
|     *pps_cb_qp_offset* | *se(v)* |
|     *pps_cr_qp_offset* | *se(v)* |
|     *pps_joint_cbcr_qp_offset_present_flag* | *u(1)* |
|     *pps_slice_chroma_qp_offsets_presnet_flag* | *u(1)* |
|     *pps_cu_chroma_qp_offset_list_enabled_flag* | *u(1)* |
|   *}* | |
|   if( pps_joint_cbc_qp_offset_present_flag ) | |
|     pps_joint_cbcr_qp_offset_value | se(v) |
|   if( pps_cu_chroma_qp_offset_list_enabled_flag ) { | |
|     chroma_qp_offset_list_len_minus1 | ue(v) |
|     for( i = 0; i <= chroma_qp_offset_list_len_minus1; i++ ) { | |
|       cb_qp_offset_list[ i ] | se(v) |
|       cr_qp_offset_list[ i ] | se(v) |
|       if( pps_joint_cbcr_qp_offset_present_flag ) | |
|         joint_cbcr_qp_offset_list[ i ] | se(v) |
|     } | |
|   } | |
|   pps_weighted_pred_flag | u(1) |
|   pps_weighted_bipred_flag | u(1) |
|   deblocking_filter_control_present_flag | u(1) |
|   if( deblocking_filter_control_present_flag ) { | |
|     deblocking_filter_override_enabled_flag | u(1) |
|     pps_deblocking_filter_disabled_flag | u(1) |
|     if( !pps_deblocking_filter_disabled_flag ) { | |
|       pps_beta_offset_div2 | se(v) |
|       pps_tc_offset_div2 | se(v) |
|     } | |
|   } | |
|   constant_slice_header_params_enabled_flag | u(1) |
|   if( constant_slice_header_params_enabled_flag ) { | |
|     pps_dep_quant_enabled_idc | u(2) |
|     for( i = 0; i < 2; i++ ) | |
|       pps_ref_pic_list_sps_idc[ i ] | u(2) |
|     pps_mvd_l1_zero_idc | u(2) |
|     pps_collocated_from_l0_idc | u(2) |
|     pps_six_minus_max_num_merge_cand_plus1 | ue(v) |
|     pps_max_num_merge_cand_minus_max_num_triangle_cand_plus1 | ue(v) |
|   } | |
|   picture_header_extension_present_flag | u(1) |
|   slice_header_extension_present_flag | u(1) |
|   pps_extension_flag | u(1) |
|   if( pps_extension_flag ) | |
|     while( more_rbsp_data( ) ) | |
|       pps_extension_data_flag | u(1) |
|   rbsp_trailing_bits( ) | |
| } | |

TABLE 7

Modification to adaptation parameter set syntax from VVC Draft 7

| | Descriptor |
|---|---|
| adaptation_parameter_set_rbsp( ) { | |
|   adaptation_parameter_set_id | u(5) |
|   aps_params_type | u(3) |
|   *aps_chroma_present_flag* | *u(1)* |
|   if( aps_params_type = = ALF_APS ) | |
|     alf_data( ) | |
|   else if( aps_params_type = = LMCS_APS ) | |
|     lmcs_data( ) | |
|   else if( aps_params_type = = SCALING_APS ) | |

TABLE 7-continued

Modification to adaptation parameter set syntax from VVC Draft 7

| | Descriptor |
|---|---|
|     scaling_list_data( ) | |
|   aps_extension_flag | u(1) |
|   if( aps_extension_flag) | |
|     while( more_rbsp_data( ) ) | |
|       aps_extension_data_flag | u(1) |
|   rbsp_trailing_bits( ) | |
| } | |

TABLE 8

Modification to adaptive loop filter data syntax from VVC Draft 7

| | Descriptor |
|---|---|
| alf_data( ) { | |
|   alf_luma_filter_signal_flag | u(1) |
|   if( aps_chroma_present_flag ) | |
|     *alf_chroma_filter_signal_flag* | u(1) |
|   if( alf_luma_filter_signal_flag ) { | |
|     alf_luma_clip_flag | u(1) |
|     alf_luma_num_filters_signalled_minus1 | ue(v) |
|     if( alf_luma_num_filters_signalled_minus1 > 0 ) { | |
|       for( filtIdx = 0; filtIdx < NumAlfFilters; filtIdx++ ) | |
|         alf_luma_coeff_delta_idx[ filtIdx ] | u(v) |
|     } | |
|     for( sfIdx = 0; sfIdx <= alf_luma_num_filters_signalled_minus1; sfIdx++ ) { | |
|       for( j = 0; j < 12; j++) { | |
|         alf_luma_coeff_abs[ sfIdx ][ j ] | uek(v) |
|         if( alf_luma_coeff_abs[ sfIdx ][ j ] ) | |
|           alf_luma_coeff_sign[ sfIdx ][ j ] | u(1) |
|       } | |
|     } | |
|     if( alf_luma_clip_flag) { | |
|       for( sfIdx = 0; sfIdx <= alf_luma_num_filters_signalled_minus1; sfIdx++ ) { | |
|         for( j = 0; j < 12; j++) | |
|           alf_luma_clip_idx[ sfIdx ][ j ] | u(2) |
|       } | |
|     } | |
|   } | |
|   if( alf_chroma_filter_signal_flag) { | |
|     alf_chroma_num_alt_filters_minus1 | ue(v) |
|     for( altIdx = 0; altIdx <= alf_chroma_num_alt_filters_minus1; altIdx++ ) { | |
|       alf_chroma_chp_flag[ altIdx ] | u(1) |
|       for( j = 0; j < 6; j++ ) { | |
|         alf_chroma_coeff_abs[ altIdx ][ j ] | uek(v) |
|         if( alf_chroma coeff_abs[ altIdx ][ j ] > 0 ) | |
|           alf_chroma_coeff_sign[ altIdx ][ j ] | u(1) |
|       } | |
|       if( alf_chroma clip flag[ altIdx ] ) { | |
|         for( j = 0; j < 6; j++) | |
|           alf_chroma_clip_idx[ altIdx ][ j ] | u(2) |
|       } | |
|     } | |
|   } | |
| } | | pps_chroma_present_flag may specify whether chroma component is present. When pps_chroma_present_flag equal to 1, chroma related syntax may be present in PPS. pps_chroma_present_flag equal to 0 may specify that chroma component does not present. It may be a requirement of bitstream conformance that pps_chroma_present_flag equal to 0 when ChromaArrayType is equal to 0.

pps_cb_qp_offset and pps_cr_qp_offset may specify the offsets to the luma quantization parameter $Qp'_Y$ used for deriving $Qp'_{Cb}$ and $Qp'_{Cr}$, respectively. The values of pps_cb_qp_offset and pps_cr_qp_offset may be in the range of −12 to +12, inclusive. When ChromaArrayType is equal to 0, pps_cb_qp_offset and pps_cr_qp_offset may be not used in the decoding process and decoders may ignore their value.

pps_joint_cbcr_qp_offset_present_flag equal to 1 may specify that pps_joint_cbcr_qp_offset_value and joint_cbcr_qp_offset_list[i] are present in the PPS RBSP syntax structure. pps_joint_cbcr_qp_offset_present_flag equal to 0 may specify that pps_joint_cbcr_qp_offset_value and joint_cbcr_qp_offset_list[i] are not present in the PPS RBSP syntax structure. When pps_joint_cbcr_qp_offset_present_flag is not present, it may be inferred to be be equal to 0.

pps_slice_chroma_qp_offsets_present_flag equal to 1 may indicate that the slice_cb_qp_offset and slice_cr_qp_offset syntax elements are present in the associated slice headers. pps_slice_chroma_qp_offsets_present_flag equal to 0 may indicate that these syntax elements are not present in the associated slice headers. When pps_slice_chroma_qp_offsets_present_flag is not present, it may be inferred to be equal to 0.

pps_cu_chroma_qp_offset_list_enabled_flag equal to 1 may specify that the pic_cu_chroma_qp_offset_subdiv_intra_slice and pic_cu_chroma_qp_offset_subdiv_inter_slice syntax elements are present in PHs referring to the PPS and that cu_chroma_qp_offset_flag may be present in the transform unit syntax and the palette coding syntax. pps_cu_chroma_qp_offset_list_enabled_flag equal to 0 may specify that the pic_cu_chroma_qp_offset_subdiv_intra_slice and pic_cu_chroma_qp_offset_subdiv_inter_slice syntax elements are not present in picture headers referring to the PPS and that the cu_chroma_qp_offset_flag is not present in the transform unit syntax and the palette coding syntax. When pps_cu_chroma_qp_offset_list_enabled_flag is not present, it may be inferred to be equal to 0.

aps_chroma_present_flag specifies whether chroma component is present. When aps_chroma_present_flag equal to 1, chroma related syntax may be present in APS. aps_chroma_present_flag equal to 0 may specify that chroma related syntaxes are not present. It may be a requirement of bitstream conformance that pps_chroma_present_flag equal to 0 when ChromaArrayType equal to 0.

alf_chroma_filter_signal_flag equal to 1 may specify that a chroma filter is signaled. alf_chroma_filter_signal_flag equal to 0 may specify that a chroma filter is not signaled. When alf_chroma_filter_signal_flag is not present, it may be inferred to be equal to 0.

When ChromaArrayType is 0, a video component may be encoded as if it is monochrome or 4:4:4 with separately coded colour planes.

Figure 5A:
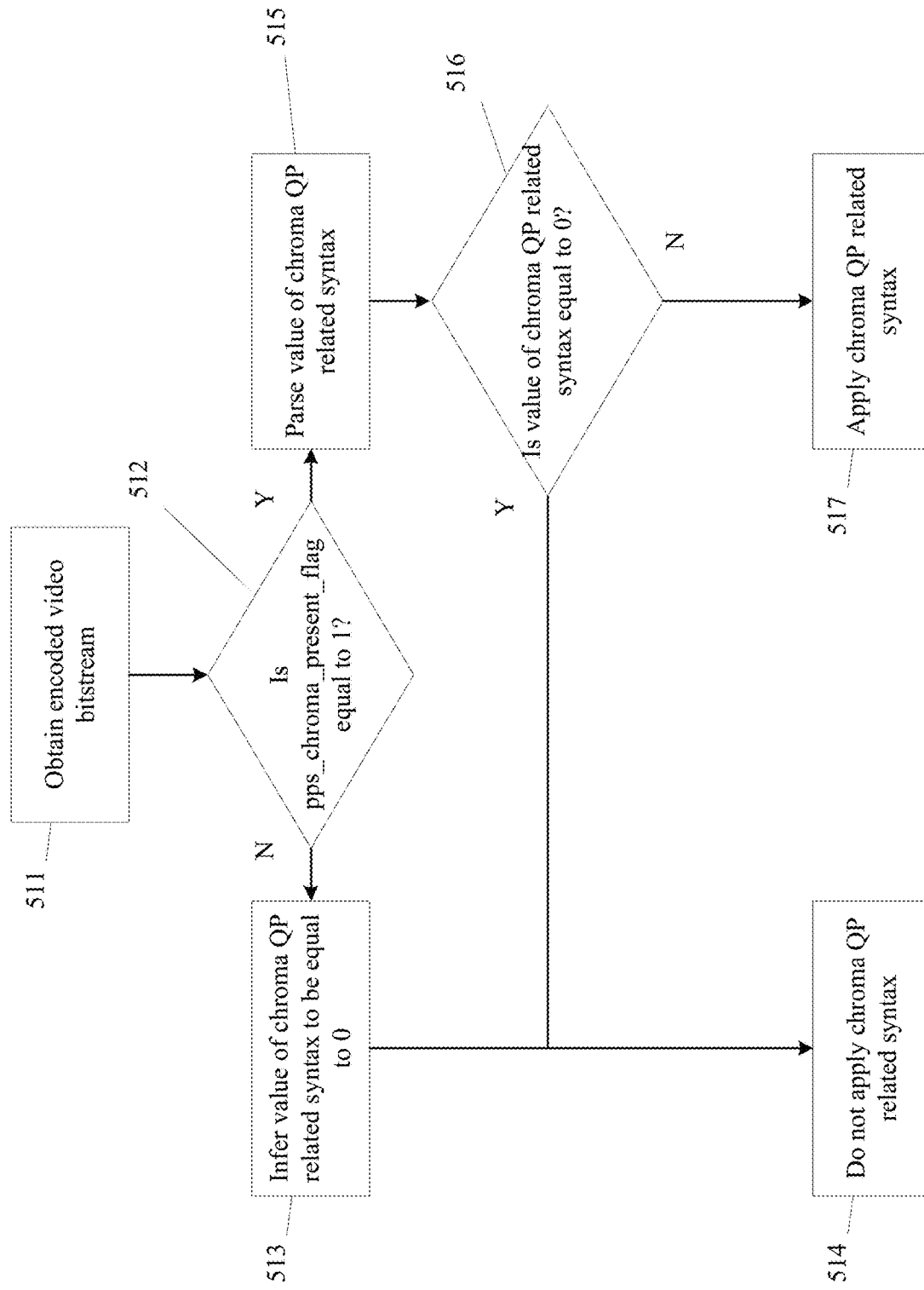
FIGS. 5A-5C illustrate flowcharts of example processes for decoding an encoded video bitstream in accordance with embodiments.

In FIG. 5A, chroma QP related syntax parsing may be disabled when pps_chroma_present_flag is 0 to avoid unnecessary decoding process. The syntax such as pps_cb_qp_offset, pps_cr_qp_offset, pps_joint_cbcr_qp_offset_present_flag, pps_slice_chroma_qp_offsets_present_flag, pps_cu_chroma_qp_offset_list_enabled_flag may be inferred to 0, and thus not applied in QP derivation process in decoder side.

Figure 5B:
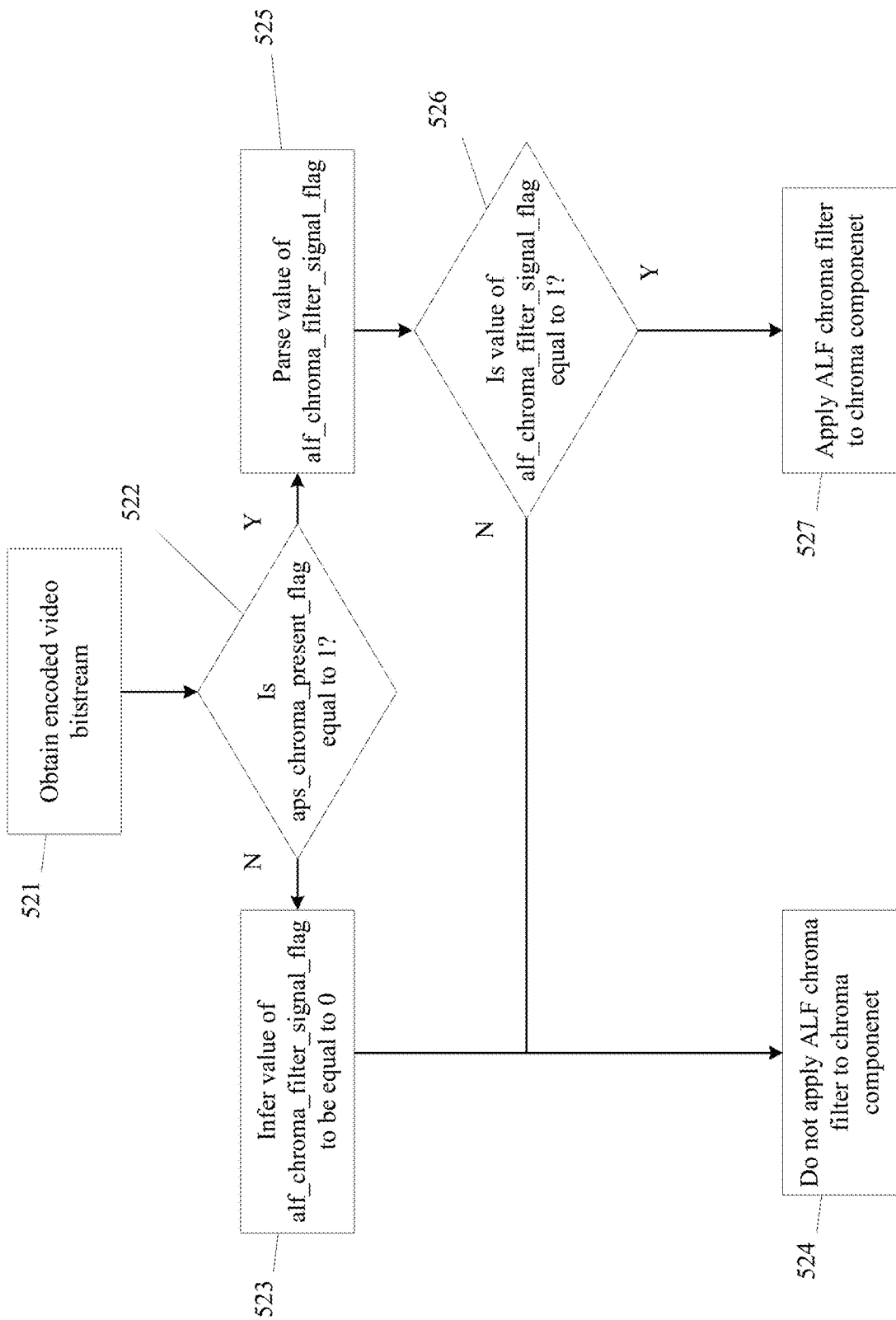

In FIG. 5B, chroma ALF filter as a chroma filter may be disabled when aps_chroma_present_flag is 0 to avoid unnecessary decoding process. Therefore, the syntax alf_chroma_filter_signal_flag are inferred to 0.

Figure 5C:
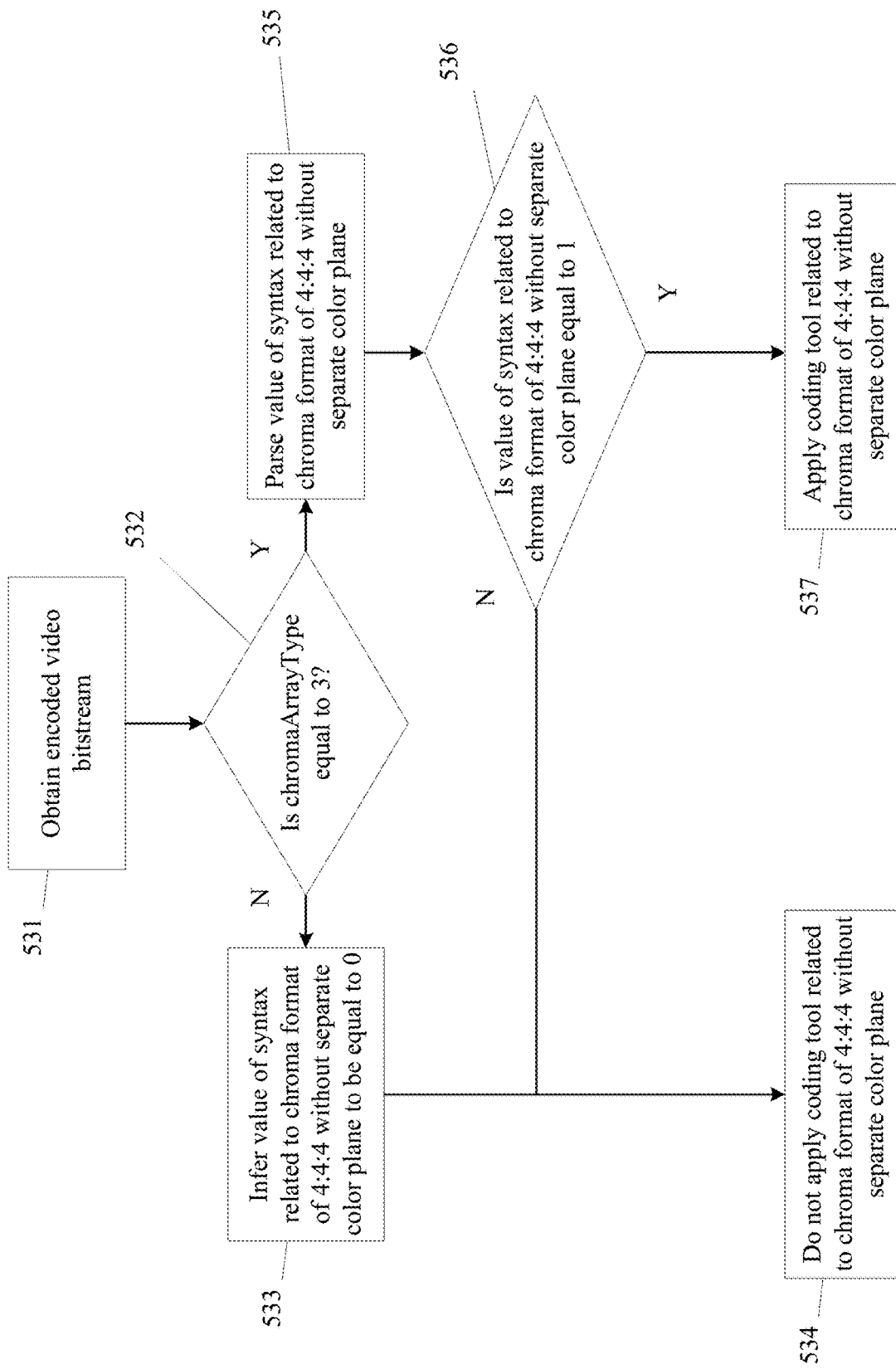

In FIG. 5C, VVC Draft 7 has several coding tools only applied to when chroma format is 4:4:4 without separate colour plane such as BDPCM for chroma, PLT and ACT. The syntax related to these tools should not be parsed when chroma format is 4:4:4 with separate colour plane which means there chroma component present as luma component. Therefore, parsing of these syntax should be performed only when ChromaArrayType equals to 3 to avoid unnecessary decoding process.

In detail, FIGS. 5A-5C are flowcharts of example processes 500A, 500B, and 500C for decoding an encoded video bitstream, according to embodiments. In embodiments, any of processes 500A, 500B, and 500C, or any portions of processes 500A, 500B, and 500C, may be combined in any combination or permutation and in any order as desired. In some implementations, one or more process blocks of FIGS. 5A-5C may be performed by decoder 210. In some implementations, one or more process blocks of FIGS. 5A-5C may be performed by another device or a group of devices separate from or including decoder 210, such as encoder 203.

As shown in FIG. 5A, process 500A may include obtaining an encoded video bitstream including a coded video sequence (block 511).

As further shown in FIG. 5A, process 500A may include determining whether pps_chroma_present_flag is equal to 1 (block 512).

As further shown in FIG. 5A, if pps_chroma_present_flag is not equal to 1 (NO at block 512), process 500A may proceed to block 513. However, if pps_chroma_present_flag is equal to 1 (YES at block 512), process 500A may proceed to block 515.

As further shown in FIG. 5A, process 500A may include inferring a value of chroma QP related syntax to be equal to 0 without parsing the chroma QP related syntax (block 513), and then decoding the video sequence without applying the chroma QP related syntax (block 514).

As further shown in FIG. 5A, process 500A may include parsing a value of the chroma QP related syntax (block 515).

As further shown in FIG. 5A, process 500A may include determining whether a value of the chroma QP related syntax is equal to 0 (block 516).

As further shown in FIG. 5A, if the value of the chroma QP related syntax is determined to be equal to 0 (YES at block 516), process 500A may proceed to block 514. However, if the value of the chroma QP related syntax is determined not to be equal to 0 (NO at block 516), process 500A may proceed to block 517, in which the chroma QP related syntax is applied while decoding the video sequence.

As shown in FIG. 5B, process 500B may include obtaining an encoded video bitstream including a coded video sequence (block 521).

As further shown in FIG. 5B, process 500B may include determining whether aps_chroma_present_flag is equal to 1 (block 522).

As further shown in FIG. 5B, if aps_chroma_present_flag is not equal to 1 (NO at block 522), process 500B may proceed to block 523. However, if aps_chroma_present_flag is equal to 1 (YES at block 522), process 500B may proceed to block 525.

As further shown in FIG. 5B, process 500B may include inferring a value of alf_chroma_filter_signal_flag to be equal to 0 without parsing alf_chroma_filter_signal_flag (block 523), and then decoding the video sequence without applying the ALF chroma filter (block 524).

As further shown in FIG. 5B, process 500B may include parsing a value of alf_chroma_filter_signal_flag (block 525).

As further shown in FIG. 5B, process 500B may include determining whether a value of the alf_chroma_filter_signal_flag is equal to 1 (block 526).

As further shown in FIG. 5B, if the value of the chroma QP related syntax is determined not to be equal to 1 (NO at block 526), process 500B may proceed to block 524. However, if the value of the alf_chroma_filter_signal_flag is determined to be equal to 1 (YES at block 526), process 500B may proceed to block 527, in which the ALF chroma filter is applied while decoding the video sequence.

As shown in FIG. 5C, process 500C may include obtaining an encoded video bitstream including a coded video sequence (block 531).

As further shown in FIG. 5C, process 500C may include determining whether chromaArrayType is equal to 3 (block 532).

As further shown in FIG. 5C, if chromaArrayType is not equal to 3 (NO at block 532), process 500C may proceed to block 533. However, if chromaArrayType is equal to 3 (YES at block 532), process 500C may proceed to block 535.

As further shown in FIG. 5C, process 500C may include inferring a value of syntax related to chroma format of 4:4:4 without separate color plane to be equal to 0 without parsing the syntax related to chroma format of 4:4:4 without separate color plane (block 533), and then decoding the video sequence without applying a coding tool related to chroma format of 4:4:4 without separate color plane (block 534).

As further shown in FIG. 5C, process 500C may include parsing a value of the syntax related to chroma format of 4:4:4 without separate color plane (block 535).

As further shown in FIG. 5C, process 500C may include determining whether a value of the syntax related to chroma format of 4:4:4 without separate color plane is equal to 1 (block 536).

As further shown in FIG. 5C, if the value of the syntax related to chroma format of 4:4:4 without separate color plane is determined not to be equal to 1 (NO at block 536), process 500C may proceed to block 534. However, if the value of the syntax related to chroma format of 4:4:4 without separate color plane is determined to be equal to 1 (YES at block 536), process 500C may proceed to block 537, in which the tool related to chroma format of 4:4:4 without separate color plane is applied while decoding the video sequence.

Figure 6:
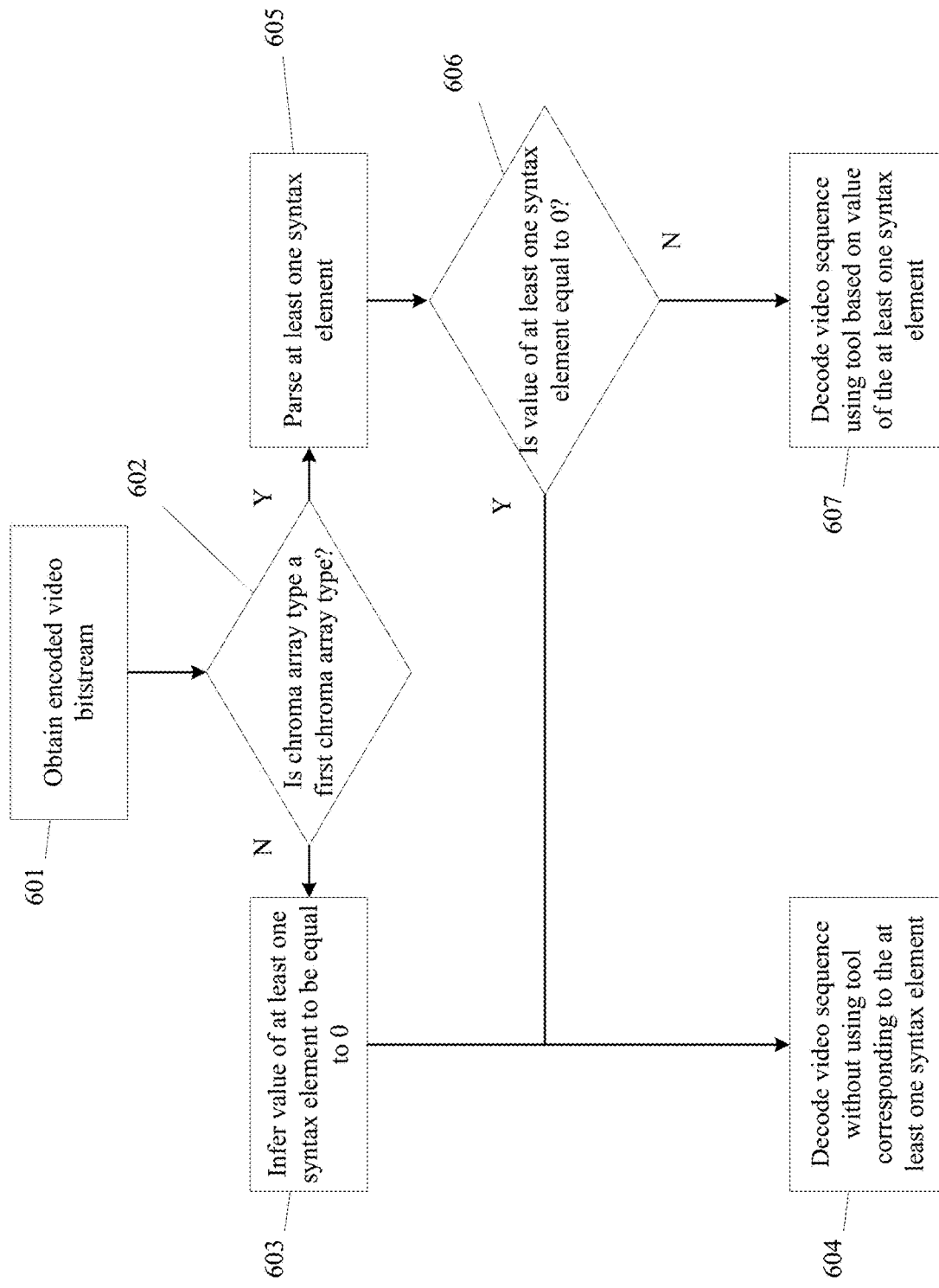
FIG. 6 is a flowchart of an example process for decoding an encoded video bitstream in accordance with embodiments.

FIG. 6 is a flowchart of an example process 600 for decoding an encoded video bitstream, according to embodiments. In embodiments, any portion of process 600 may be combined or arranged in any combination or permutation and in any order as desired. In some implementations, one or more process blocks of FIG. 6 may be performed by decoder 210. In some implementations, one or more process blocks of FIG. 6 may be performed by another device or a group of devices separate from or including decoder 210, such as encoder 203.

As shown in FIG. 6, process 600 may include obtaining an encoded video bitstream (block 601).

As further shown in FIG. 6, process 600 may include determining whether a chroma array type of a video sequence included in the encoded video bitstream is a first chroma array type indicating that the video sequence includes multiple color planes and that the multiple color planes are jointly encoded (block 602).

As further shown in FIG. 6, if the chroma array type is not the first chroma array type (NO at block 602), process 600 may proceed to block 603. However, if the chroma array type is the first chroma array type (YES at block 602), process 600 may proceed to block 605.

As further shown in FIG. 6, process 600 may include inferring a value of at least one syntax element to be 0 without parsing the at least one syntax element from the encoded video bitstream (block 603), and then decoding the video sequence without applying at least one tool corresponding to the at least one syntax element (block 604).

As further shown in FIG. 6, process 600 may include parsing the at least one syntax element (block 605).

As further shown in FIG. 6, process 600 may include determining whether a value of the at least one syntax element is equal to 0 (block 602).

As further shown in FIG. 6, if the value of the at least one syntax element is determined to be equal to 0 (YES at block 606), process 600 may proceed to block 604. However, if the value of the at least one syntax element is determined not to be equal to 0 (NO at block 606), process 600 may proceed to block 607, in which the video sequence is decoded using a tool based on the value of the at least one syntax element.

In embodiments, the chroma array type may be determined based on a first flag indicating whether the video sequence includes the multiple color planes, and a first syntax element indicating a chroma format of the video sequence.

In embodiments, the at least one tool may include at least one from among block-based delta pulse code modulation, palette mode coding, and adaptive color transform.

In embodiments, based on the chroma array type being a second chroma array type indicating that the video sequence does not include the multiple color planes, or that the multiple color planes are separately encoded, a value of a second flag signaled in a picture parameter set (PPS) may be set equal to 0.

In embodiments, the at least one syntax element may be signaled in the PPS, and the at least one tool may correspond to a chroma quantization parameter of the video sequence.

In embodiments, based on the chroma array type being a second chroma array type indicating that the video sequence does not include the multiple color planes, or that the multiple color planes are separately encoded, a value of a third flag signaled in an adaptation parameter set (APS) may be set equal to zero.

In embodiments, the at least one syntax element may be signaled in the APS, and the at least one tool may correspond to an adaptive loop filter.

Although FIGS. 5A-5C and 6 show example blocks of processes 500A, 500B, 500C, and 600, in some implementations, processes 500A, 500B, 500C, and 600 may include additional blocks, fewer blocks, different blocks, or differently arranged blocks than those depicted in FIGS. 5A-5C and 6. Additionally, or alternatively, two or more of the blocks of processes 500A, 500B, 500C, and 600 may be performed in parallel.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above, can be implemented as computer software using computer-readable instructions and physically stored in one or more computer-readable media. For example, FIG. 7 shows a computer system 700 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 7 for computer system 700 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 700.

Computer system 700 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 701, mouse 702, trackpad 703, touch screen 710 and associated graphics adapter 750, data-glove 1204, joystick 705, microphone 706, scanner 707, camera 708.

Computer system 700 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 710, data-glove 1204, or joystick 705, but there can also be tactile feedback devices that do not serve as input devices), audio output devices (such as: speakers 709, headphones (not depicted)), visual output devices (such as screens 710 to include cathode ray tube (CRT) screens, liquid-crystal display (LCD) screens, plasma screens, organic light-emitting diode (OLED) screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 700 can also include human accessible storage devices and their associated media such as optical media including CD/DVD ROM/RW 720 with CD/DVD or the like media 721, thumb-drive 722, removable hard drive or solid state drive 723, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 700 can also include interface(s) to one or more communication networks (955). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include global systems for mobile communications (GSM), third generation (3G), fourth generation (4G), fifth generation (5G), Long-Term Evolution (LTE), and the like, TV wireline or wireless wide area digital networks to include cable TV, satellite TV, and terrestrial broadcast TV, vehicular and industrial to include CANBus, and so forth. Certain networks commonly require external network interface adapters (954) that attached to certain general purpose data ports or peripheral buses (949) (such as, for example universal serial bus (USB) ports of the computer system 700; others are commonly integrated into the core of the computer system 700 by attachment to a system bus as described below (for example Ethernet interface into a PC computer system or cellular network interface into a smartphone computer system). As an example, network 755 may be connected to peripheral bus 749 using network interface 754. Using any of these networks, computer system 700 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces (954) as described above.

Aforementioned human interface devices, human-accessible storage devices, and network interfaces can be attached to a core 740 of the computer system 700.

The core 740 can include one or more Central Processing Units (CPU) 741, Graphics Processing Units (GPU) 742, specialized programmable processing units in the form of Field Programmable Gate Areas (FPGA) 743, hardware accelerators 744 for certain tasks, and so forth. These devices, along with Read-only memory (ROM) 745, Random-access memory (RAM) 746, internal mass storage such as internal non-user accessible hard drives, solid-state drives (SSDs), and the like 747, may be connected through a system bus 748. In some computer systems, the system bus 748 can be accessible in the form of one or more physical plugs to enable extensions by additional CPUs, GPU, and the like. The peripheral devices can be attached either directly to the core's system bus 748, or through a peripheral bus 749. Architectures for a peripheral bus include peripheral component interconnect (PCI), USB, and the like.

CPUs 741, GPUs 742, FPGAs 743, and accelerators 744 can execute certain instructions that, in combination, can make up the aforementioned computer code. That computer code can be stored in ROM 745 or RAM 746. Transitional data can be also be stored in RAM 746, whereas permanent data can be stored for example, in the internal mass storage 747. Fast storage and retrieve to any of the memory devices can be enabled through the use of cache memory, that can be closely associated with one or more CPU 741, GPU 742, mass storage 747, ROM 745, RAM 746, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 700, and specifically the core 740 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 740 that are of non-transitory nature, such as core-internal mass storage 747 or ROM 745. The software implementing various embodiments of the present disclosure can be stored in such devices and executed by core 740. A computer-readable medium can include one or more memory devices or chips, according to particular needs. The software can cause the core 740 and specifically the processors therein (including CPU, GPU, FPGA, and the like) to execute particular processes or particular parts of particular processes described herein, including defining data structures stored in RAM 746 and modifying such data structures according to the processes defined by the software. In addition or as an alternative, the computer system can provide functionality as a result of logic hardwired or otherwise embodied in a circuit (for example: accelerator 744), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

Acronyms:
HEVC: High Efficiency Video Coding
VVC: Versatile Video Coding
JVET: Joint Video Exploration Team
CU: Coding Unit
VTM: Versatile Video Coding Test Model
SPS: sequence parameter set
BDPCM: Block-based Delta Pulse Code Modulation
ACT: Adaptive Color Transform
4:4:4: video with chroma format equal to 4:4:4
ALF: adaptive loop filter
QP: quantization parameter
PLT: palette mode coding

What is claimed is:

1. A method of generating an encoded video bitstream, the method being performed by at least one processor and comprising:

obtaining video data;
determining whether a chroma array type of a video sequence included in the video data is a first chroma array type indicating that the video sequence includes multiple color planes and that the multiple color planes are jointly encoded;
setting a first flag indicating whether the video sequence includes the multiple color planes, and a first syntax element indicating a chroma format of the video sequence; and
generating the encoded video bitstream based on the video sequence, the first flag, and the first syntax element,
wherein based on determining that the chroma array type is not the first chroma array type, the video sequence is encoded without applying at least one tool corresponding to at least one syntax element, and the first flag and the first syntax element indicate to a decoder to set a value of the at least one syntax element to zero without parsing the at least one syntax element from the encoded video bitstream.

2. The method of claim 1, wherein based on determining that the chroma array type is the first chroma array type, the video sequence is encoded by applying the at least one tool corresponding to the at least one syntax element, and the first flag and the first syntax element are set to indicate to the decoder to parse the at least one syntax element from the encoded video bitstream.

3. The method of claim 1, wherein the at least one tool comprises at least one from among block-based delta pulse code modulation, palette mode coding, and adaptive color transform.

4. The method of claim 1, further comprising:
based on the chroma array type being a second chroma array type indicating that the video sequence does not include the multiple color planes, or that the multiple color planes are separately encoded, setting a value of a second flag signaled in a picture parameter set (PPS) equal to zero.

5. The method of claim 4, wherein the at least one syntax element is signaled in the PPS, and
wherein the at least one tool corresponds to a chroma quantization parameter of the video sequence.

6. The method of claim 1, further comprising:
based on the chroma array type being a second chroma array type indicating that the video sequence does not include the multiple color planes, or that the multiple color planes are separately encoded, setting a value of a third flag signaled in an adaptation parameter set (APS) equal to zero.

7. The method of claim 6, wherein the at least one syntax element is signaled in the APS, and
wherein the at least one tool corresponds to an adaptive loop filter.

8. A device for generating an encoded video bitstream, the device comprising:
at least one memory configured to store program code; and
at least one processor configured to read the program code and operate as instructed by the program code, the program code including:
obtaining code configured to cause the at least one processor to obtain video data;
determining code configured to cause the at least one processor to determine whether a chroma array type of a video sequence included in the video data is a first chroma array type indicating that the video sequence includes multiple color planes and that the multiple color planes are jointly encoded;

first setting code configured to cause the at least one processor to set a first flag indicating whether the video sequence includes the multiple color planes, and a first syntax element indicating a chroma format of the video sequence; and generating code configured to cause the at least one processor to generate the encoded video bitstream based on the video sequence, the first flag, and the first syntax element, wherein based on determining that the chroma array type is not the first chroma array type, the video sequence is encoded without applying at least one tool corresponding to at least one syntax element, and the first flag and the first syntax element indicate to a decoder to set a value of the at least one syntax element to zero without parsing the at least one syntax element from the encoded video bitstream.

9. The device of claim 8, wherein based on the video sequence is encoded by applying the at least one tool corresponding to the at least one syntax element, and the first flag and the first syntax element are set to indicate to the decoder to parse the at least one syntax element from the encoded video bitstream.

10. The device of claim 8, wherein the at least one tool comprises at least one from among block-based delta pulse code modulation, palette mode coding, and adaptive color transform.

11. The device of claim 8, further comprising:
second setting code configured to cause the at least one processor to, based on the chroma array type being a second chroma array type indicating that the video sequence does not include the multiple color planes, or that the multiple color planes are separately encoded, set a value of a second flag signaled in a picture parameter set (PPS) equal to zero.

12. The device of claim 11, wherein the at least one syntax element is signaled in the PPS, and
wherein the at least one tool corresponds to a chroma quantization parameter of the video sequence.

13. The device of claim 8, further comprising:
third setting code configured to cause the at least one processor to, based on the chroma array type being a second chroma array type indicating that the video sequence does not include the multiple color planes, or that the multiple color planes are separately encoded, set a value of a third flag signaled in an adaptation parameter set (APS) equal to zero.

14. The device of claim 13, wherein the at least one syntax element is signaled in the APS, and
wherein the at least one tool corresponds to an adaptive loop filter.

15. A non-transitory computer-readable medium storing instructions, the instructions comprising: one or more instructions that, when executed by one or more processors of a device for generating an encoded video bitstream, cause the one or more processors to:

obtain video data;
determine whether a chroma array type of a video sequence included in the video data is a first chroma array type indicating that the video sequence includes multiple color planes and that the multiple color planes are jointly encoded;
set a first flag indicating whether the video sequence includes the multiple color planes, and a first syntax element indicating a chroma format of the video sequence; and
generate the encoded video bitstream based on the video sequence, the first flag, and the first syntax element,
wherein based on determining that the chroma array type is not the first chroma array type, the video sequence is encoded without applying at least one tool corresponding to at least one syntax element, and the first flag and the first syntax element indicate to a decoder to set a value of the at least one syntax element to zero without parsing the at least one syntax element from the encoded video bitstream.

16. The non-transitory computer-readable medium of claim 15, wherein based on determining that the chroma array type is the first chroma array type, the video sequence is encoded by applying the at least one tool corresponding to the at least one syntax element, and the first flag and the first syntax element are set to indicate to the decoder to parse the at least one syntax element from the encoded video bitstream.

17. The non-transitory computer-readable medium of claim 15, wherein based on determining that the chroma array type is the first chroma array type, the video sequence is encoded by applying the at least one tool corresponding to the at least one syntax element, and the first flag and the first syntax element are set to indicate to the decoder to parse the at least one syntax element from the encoded video bitstream.

18. The non-transitory computer-readable medium of claim 15, wherein the at least one tool comprises at least one from among block-based delta pulse code modulation, palette mode coding, and adaptive color transform.

19. The non-transitory computer-readable medium of claim 15, wherein the instructions are further configured to cause the one or more processors to:
based on the chroma array type being a second chroma array type indicating that the video sequence does not include the multiple color planes, or that the multiple color planes are separately encoded, set a value of a second flag signaled in a picture parameter set (PPS) equal to zero.

20. The non-transitory computer-readable medium of claim 15, wherein the instructions are further configured to cause the one or more processors to:
based on the chroma array type being a second chroma array type indicating that the video sequence does not include the multiple color planes, or that the multiple color planes are separately encoded, set a value of a third flag signaled in an adaptation parameter set (APS) equal to zero.

* * * * *